(12) United States Patent
Nakamura et al.

(10) Patent No.: US 7,658,273 B2
(45) Date of Patent: Feb. 9, 2010

(54) CARRIAGE-TYPE CONVEYANCE DEVICE

(75) Inventors: Jiro Nakamura, Osaka (JP); Nobuhiro Hayashi, Shiga (JP)

(73) Assignee: Daifuku Co., Ltd (JP)

( * ) Notice: Subject to any disclaimer, the term of this patent is extended or adjusted under 35 U.S.C. 154(b) by 68 days.

(21) Appl. No.: 11/913,205

(22) PCT Filed: Jul. 27, 2006

(86) PCT No.: PCT/JP2006/314833

§ 371 (c)(1),
(2), (4) Date: Oct. 31, 2007

(87) PCT Pub. No.: WO2007/015408

PCT Pub. Date: Feb. 8, 2007

(65) Prior Publication Data

US 2009/0090598 A1    Apr. 9, 2009

(30) Foreign Application Priority Data

Aug. 4, 2005    (JP) .............................. 2005-226199

(51) Int. Cl.
*B65G 47/24*    (2006.01)
(52) U.S. Cl. .................... 198/414; 198/468.6; 198/406; 104/34
(58) Field of Classification Search ............. 198/468.6, 198/468.8, 406, 414; 104/34
See application file for complete search history.

(56) References Cited

U.S. PATENT DOCUMENTS 5,127,336 A * 7/1992 Wakabayashi ............... 104/35
6,105,749 A * 8/2000 Block et al. ............. 198/370.03
6,257,372 B1 * 7/2001 Schirmer ..................... 187/269
6,308,404 B1 * 10/2001 Hirschmann et al. .......... 29/822
7,077,620 B2 * 7/2006 Ishioka ..................... 414/749.1
7,178,660 B2 * 2/2007 Dehne et al. ............. 198/463.1
2002/0162727 A1 * 11/2002 Matsuo ........................ 198/412
2003/0106454 A1 * 6/2003 Olbort .......................... 104/35

FOREIGN PATENT DOCUMENTS

JP    2004-33136    2/2004

* cited by examiner

*Primary Examiner*—Mark A Deuble
(74) *Attorney, Agent, or Firm*—St. Onge Steward Johnston & Reens LLC

(57) ABSTRACT

A carriage-type conveyance device using a carriage having a vertically movable object-supporting base that is controlled by a cam rail on the floor side, in which a turntable for changing the direction of the carriage has a low-floor structure. In the carriage-type conveyance device, the object-supporting base that is vertically movable between a lowered position and a lifted position is placed on a conveyance carriage (1), a cam follower roller vertically moving in association with the movement of the object-supporting body is provided at the bottom of the conveyance carriage (1), and a cam device (58) for pushing up the cam follower roller and a work section (3A) in which the object support base is supported at the lifted position are provided in a traveling route of the conveyance carriage (1). The conveyance device further has the turntable (7) placed in a traveling route on the downstream side of the work section (3A) and changing the direction of the conveyance carriage (1), and also has a means for holding at the lifted position the object-supporting body of the conveyance carriage (1) from at least the time immediately before the object-supporting body enters into the turntable (7) until it has exited from the rotated turntable (7).

9 Claims, 16 Drawing Sheets

Fig.11
(A)
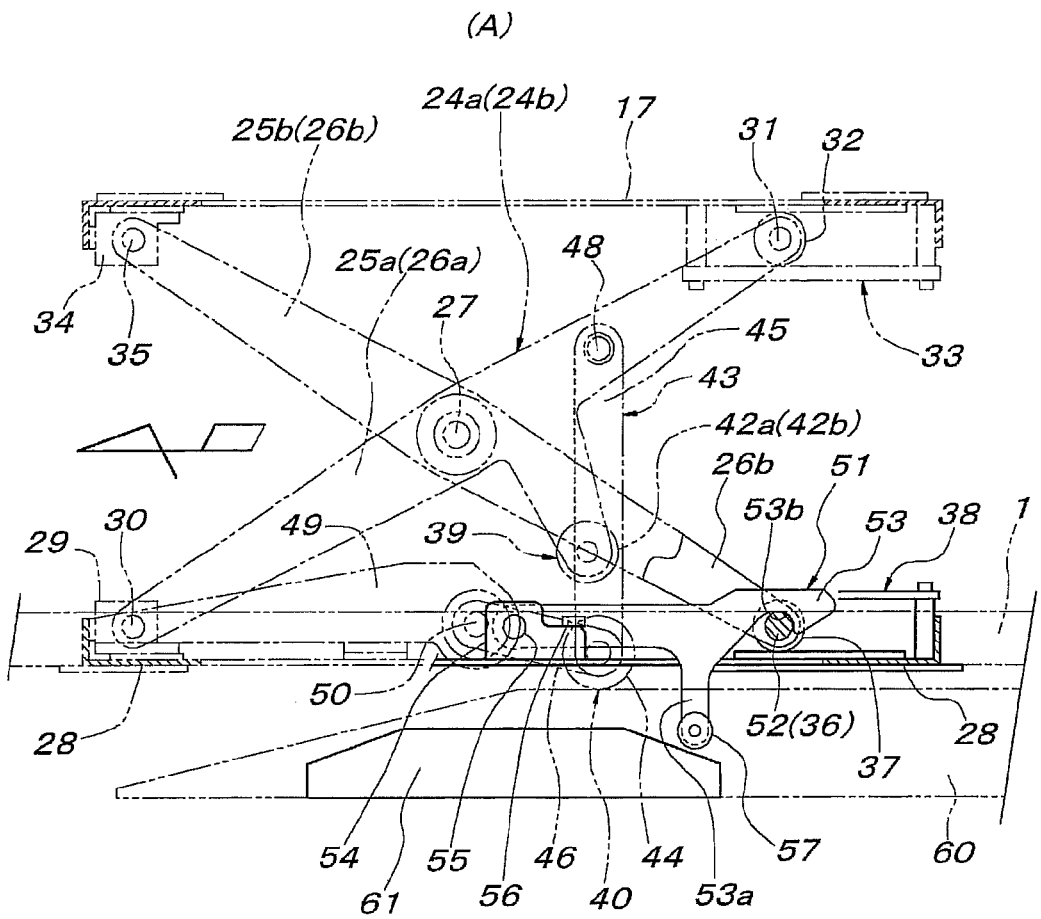
(B)
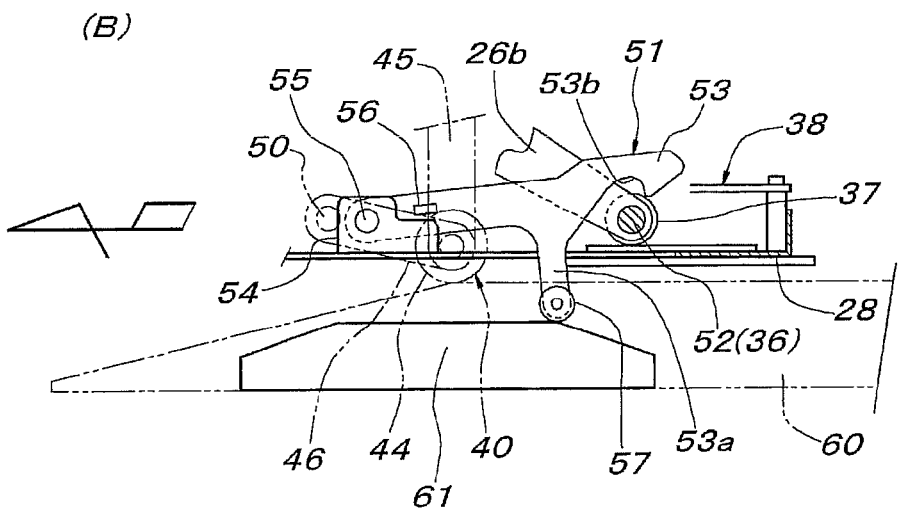

CARRIAGE-TYPE CONVEYANCE DEVICE

TECHNICAL FIELD

The present invention relates to a carriage-type conveyance device comprising a vertically movable object supporting base that is controlled by cam rails on the floor side.

BACKGROUND ART

Such a type of carriage-type conveyance device, that is, a carriage-type conveyance device in which an object supporting base vertically movable between a lowered position and a lifted position is provided on a conveyance carriage capable of traveling on a predetermined traveling route, and at the bottom of the conveyance carriage, cam follower rollers vertically moving in association with the movement of the object-supporting base are provided, and in the traveling route of the conveyance carriage, cam rails for pushing up the cam follower rollers and a work section in which the object supporting base is held at the lifted position are provided, is conventionally known as disclosed in Patent document 1, etc.

Patent document 1: Japanese Published Unexamined Patent Application No. 2004-331366

DISCLOSURE OF THE INVENTION

Problem to be Solved by the Invention

In the carriage-type conveyance device constructed as described above, when a turntable for changing the direction of the conveyance carriage is provided in the traveling route of the conveyance carriage, regardless of loading of an object on the object supporting base, the object supporting base is made to ride onto the turntable in a state that the object supporting base is returned to the lowered position. However, in a construction in which object supporting base lifting and lowering cam follower rollers that vertically move in association with the movement of the object supporting base are provided at the bottom of the carriage, when the object supporting base is at the lowered position, the cam follower rollers are at the lower positions at which they come close to the floor surface, and when constructing the turntable, the cam follower rollers at the lower positions must be set so as not to interfere with the turntable side. That is, in the construction in which a pair of left and right guide rails for supporting and guiding the conveyance carriage are laid on the floor surface, to lay the conveyance carriage supporting and guiding guide rails on the turntable at the same level as the above-described guide rails, the upper surface of the turntable must be set at the same level as the floor surface, and as a result, the turntable is housed in a pit dug under the floor surface, and the cost of equipment for changing the direction of the conveyance carriage becomes very high, and in the case of a building structure in which a pit cannot be dug under the floor surface, the direction changing means like a turntable cannot be employed.

Means for Solving the Problem

An object of the present invention is to provide a carriage-type conveyance device which can solve the conventional problem as described above, and a carriage-type conveyance device according to a first aspect of the invention includes, as described by attaching the reference numerals in parentheses used in the following embodiment, an object supporting base (17) that is provided on a conveyance carriage (1) capable of traveling on a predetermined traveling route and is vertically movable between a lowered position and a lifted position, cam follower rollers (42a, 42b, 44) that are provided at the bottom of this conveyance carriage (1) and vertically move in association with the object supporting base (17), and in a traveling route of the conveyance carriage (1), cam rails (59A, 60) for pushing up the cam follower rollers (42a, 42b, 44), a work section (3A) in which the object supporting base (17) is held at the lifted position, and a turntable (7) for changing the direction of the conveyance carriage (1) disposed in the traveling route on the downstream side of the work section (3A), are provided, wherein between the work section (3A) and the turntable (7), a high-speed traveling section (3B) in which the carriage is made to travel at a high speed in a state that the object supporting base (17) is lowered to the lowered position, is provided, at a position immediately before the turntable (7), cam rails (59A,60) for pushing up the cam follower rollers (42a,42b, 44) are disposed, and an object supporting base lifted position holding means (locking means (51) or the cam rail (60)) is provided for holding the object supporting base (17), which has been lifted to the lifted position by the cam follower rollers (42a,42b,44) and the cam rails (59A,60), at the lifted position until the conveyance carriage (1) exits from the rotated turntable (7).

To carry out the present invention constructed as described above, it is possible that cam rails (59A, 60) for pushing up the object supporting base (17) are laid via the cam follower rollers (42a, 42b, 44) in the entire work section (3A) in which the object supporting base (17) is held at the lifted position or in the entire section in which the object supporting base (17) is held at the lifted position by the object supporting base lifted position holding means (including the whole traveling route on the turntable (7)), however, as described in a second aspect, the conveyance carriage (1) is provided with a means (51) for locking the object supporting base (17) at the lifted position, and at the lowered position to which the object supporting base (17) in the traveling route is lowered, an unlocking means (unlocking cam (61)) for releasing the lock of the locking means (51) is provided, and the cam rails (59A and 60) are laid only at the entrance of the section in which the object supporting base (17) is held at the lifted position, and the object supporting base lifted position holding means can be constituted by the locking means (51).

In other words, when the turntable (7) is disposed just after the work section (3A), the conveyance carriage (1) that exited from the work section (3A) can be sent into the traveling route on the turntable (7) while leaving the object supporting base (17) held at the lifted position.

The turntable (7) includes, for example, as described in a fourth aspect, a pair of left and right guide rails (64a and 64b) forming a conveyance carriage traveling route on the turntable (7), an intermediate frame (65) which joins and integrates the guide rails (64a and 64b) on their inner sides, a vertical support shaft (66) provided so as to project from the floor side to axially support this intermediate frame (65) rotatably, a plurality of supporting rollers (67a through 67d) which are attached outside the guide rails (64a and 64b) and roll on a support guide surface (74) on the floor side, and motors (68a and 68b) each of which drives and rotates at least one of the supporting rollers (67a through 67d). In this case, as described in a fifth aspect, it is possible that the supporting rollers (67a through 67d) of the turntable (7) are attached to the intermediate positions in the longitudinal directions of the guide rails (64a and 64b), other supporting auxiliary rollers (69a through 69d) are attached to the ends of the guide rails (64a and 64b), and auxiliary support guide surfaces (75 and 76) which levels the ends of the guide rails via the supporting auxiliary rollers (69a and 69c) or (69b and 69d) adjacent to the ends of the upstream side traveling route or the downstream side traveling route when the conveyance carriage traveling route on the turntable (7) is connected to this traveling route are provided on the floor side.

Furthermore, when the conveyance carriage (1) is a self-propelled type, according to self-traveling of the conveyance carriage (1), the conveyance carriage can be made to ride onto the turntable (7) and exit from the turntable (7), however, when the conveyance carriage (1) is not a self-propelled type or can be switched into a freely movable state although it is a self-propelled type, the conveyance carriage (1) can be made to ride onto the turntable (7) and exit from the turntable (7) by a drive means disposed on the traveling route side. For example, as described in a sixth aspect, a conveyance carriage loading means (81) for loading onto the turntable (7) from the upstream side traveling route and a conveyance carriage unloading means (82) for unloading from the turntable (7) onto the downstream side traveling route are disposed on the floor side, these conveyance carriage loading means (81) and conveyance carriage unloading means (82) on the floor side include friction drive wheels (83, 85) that are brought into pressure contact with one of the left and right side surfaces parallel to the traveling direction provided on the conveyance carriage (1) and backup rollers (84, 86) that are brought into contact with the other one, and the turntable (7) is constructed so that the turntable (7) is driven to rotate forward and reverse in a range between a position (conveyance carriage receiving position) at which one end of the conveyance carriage traveling route on the turntable (7) is connected to the upstream side traveling route and a position (conveyance carriage outgoing position) at which the other end of the conveyance carriage traveling route on the turntable (7) is connected to the downstream side traveling route, the friction drive wheel (83) of the conveyance carriage loading means (81) is disposed on the floor side on the side from which the conveyance carriage (1) loaded onto the turntable (7) moves away according to the rotation of the turntable (7), the friction drive wheel (85) of the conveyance carriage unloading means (82) is disposed on the floor side on the side which the conveyance carriage (1) on the turntable (7) approaches according to the rotation of the turntable (7), and backup rollers (84 and 86) of the conveyance carriage loading means (81) and the conveyance carriage unloading means (82) are made to freely exit from the inside to the outside of the rotation space of the conveyance carriage (1) on the turntable (7) according to the rotation of the turntable (7).

When the construction described in the sixth aspect is employed, as described in a seventh aspect, on the end of the upstream side traveling route (forward route (3)) to which the conveyance carriage traveling route on the turntable (7) is connected, a normally-closed stopper (90) that can freely stand and fall for preventing dropping-off of the conveyance carriage is provided, and a cam means (cam rail (94)) which interlocks with entering and exiting movements of the backup roller (84) of the conveyance carriage loading means (81) is provided so that the cam means (cam rail (94)) switches the normally-closed stopper (90) to an unworking position by interlocking with the exiting movement of the backup roller (84) of the conveyance carriage loading means (81).

EFFECT OF THE INVENTION

According to the carriage-type conveyance device described in the first aspect of the invention, when the conveyance carriage is changed in direction by a turntable, the object supporting base of the conveyance carriage is held at the lifted position by the object supporting base lifted position holding means from at least the time immediately before the carriage enters into the turntable until it completely exits from the turntable, and therefore, the cam follower rollers at the bottom of the carriage for lifting and lowering the object supporting base are also lifted to the upper position. Therefore, even when the pair of left and right guide rails of the traveling route including the work section are laid on the floor surface and the lower positions of the cam follower rollers at the bottom of the carriage (positions of the cam follower rollers when the object supporting base is at the lowered position) are set close to the floor surface between the pair of left and right guide rails, it becomes unnecessary to secure a space for moving the cam follower rollers at the lower position between the pair of left and right guide rails forming the traveling route on the turntable. Therefore, the pair of left and right guide rails forming the traveling route on the turntable can be joined and integrated together on the inner sides of the guide rails so that the turntable can be formed to be thin, and it becomes unnecessary to provide the conventional pit into which the guide rail lower portion of the turntable fits by digging the floor surface, so that the cost of equipment can be significantly reduced.

According to the construction described in the second aspect and the third aspect, it becomes unnecessary to lay cam rails for pushing up the cam follower rollers of the conveyance carriage on the turntable and on the entire region of the work section, so that the cost of the entire equipment including the turntable can be further reduced.

According to the construction described in the fourth aspect, the turntable for changing the direction of the conveyance carriage can be easily formed to be thin, however, in this case, according to the construction described in the fifth aspect, the rotation radius of the main supporting roller is reduced, and even when the support guide surface on the floor side is formed of a separate plate member laid on the floor, the radius of this separate plate member can be made small and the cost can be reduced, and in addition, the ends of the guide rails on the turntable on the side onto which the conveyance carriage is transferred are reliably supported at a predetermined level by auxiliary support guide surfaces on the floor side, and the conveyance carriage can be safely and smoothly transferred.

Furthermore, according to the construction described in the sixth aspect, even a conveyance carriage that is not a self-propelled type can be transferred onto the turntable by a friction drive method, and friction drive wheels and backup rollers as friction drive means necessary in this case are not mounted on the turntable but are installed by dividing these for the conveyance carriage loading means and the conveyance carriage unloading means on the floor side, so that the necessary strength of the turntable can be lowered, whereby the invention can be easily carried out as a thin and light-weight turntable. When rotating the turntable, it is necessary to prevent the friction drive means from obstructing this rotation, and according to the construction described in the seventh aspect, only the backup roller side including no drive source is moved, so that the construction of the entire turntable including the conveyance carriage drive means is simplified, and can be carried out inexpensively. On the end of the upstream side traveling route to which the traveling route on the turntable is not connected, a normally-closed stopper for preventing dropping-off of the conveyance carriage is necessary, and in this case, according to the construction described in the seventh aspect, an actuator for moving the backup rollers in the means for loading the conveyance carriage onto the turntable to exit prior to the turntable rotation can be used commonly as an actuator for automatically switching the normally-closed stopper to the unworking position when connecting the turntable, so that the control becomes easier than in the case where an actuator exclusive for the normally-closed stopper is provided, so that the cost of the equipment can also be further reduced.

BRIEF DESCRIPTION OF THE DRAWINGS

FIG. 11A is a longitudinal sectional side view of a main portion showing a state immediately before the object supporting base is unlocked from the lifted position, and FIG. 11B is a longitudinal sectional side view of a main portion showing a state when the object supporting base is unlocked from the lifted position;

Figure 1:
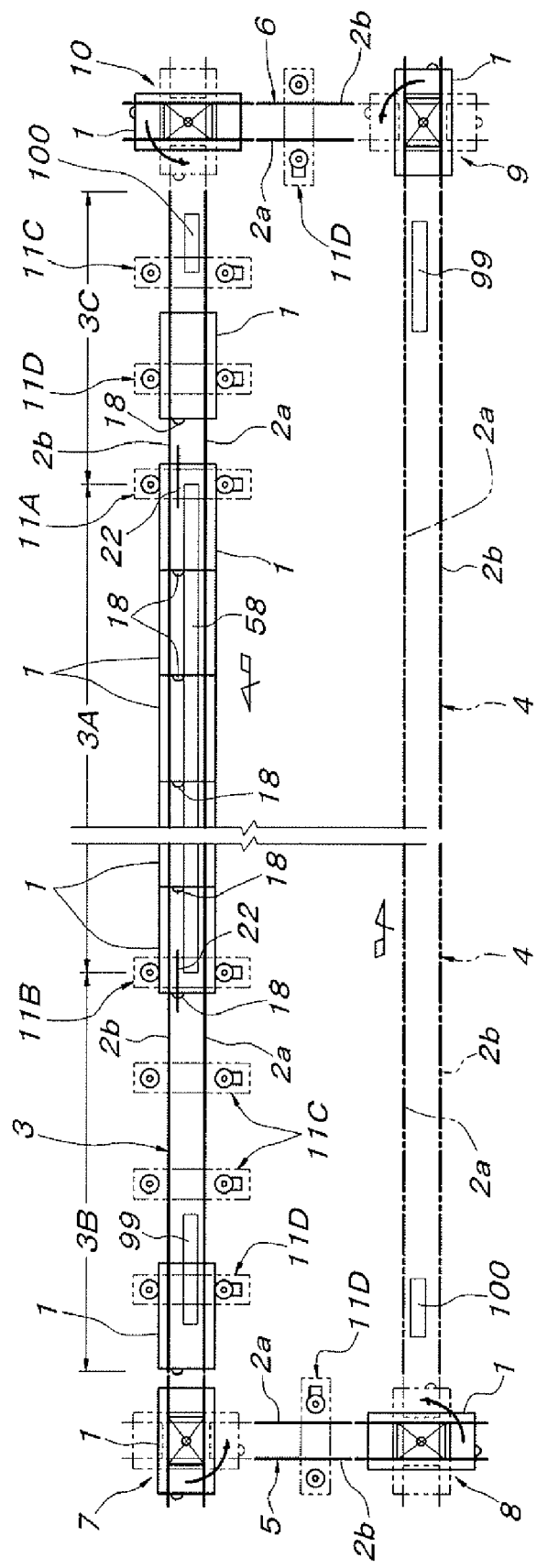
FIG. 1 is a partially cut-away plan view showing the entire layout.

DESCRIPTION OF THE REFERENCE NUMERALS 1 conveyance carriage
2a, 2b guide rail
2c oscillation preventive guide rail
3 forward route section
3B, 3C high-speed traveling section
3A work section
4 return route section
5, 6 traverse route section
7-10 turntable for changing the direction of conveyance carriage
11A rear-pushing drive means
11B braking drive means
11C high-speed drive means
11D variable-speed drive means
12, 83, 85 friction drive wheel
13, 84, 86 backup roller
14, 83a, 85a motor for driving friction drive wheel
15 wheel
16 oscillation preventive vertical shaft roller
17 vertically movable object supporting base
18 joining means
20 joining device
22 joining device opening cam rail
22b joining device opening cam follower roller
23 crosslink mechanism for lifting and lowering object supporting base
24a, 24b crosslink
33, 38 slide guide
39 first operated portion
40 second operated portion
42a, 42b cam follower roller of first operated portion
43 toggle link
44 cam follower roller of second operated portion
51 locking means of object supporting base
52 locking means engaged portion
53 locking means engagement device
57 cam follower roller of locking means engagement device
58, 99, 100 cam unit for object supporting base vertical movement control
59A start point side first cam rail
59B end point side first cam rail
60 second cam rail
61 unlocking cam
62 carriage floating preventive cam rail
63 carriage floating preventive backup roller
64a, 64b guide rail on turntable
65 intermediate frame
66 rotation center vertical support shaft of turntable 67a-67d turntable supporting roller
68a, 68b turntable drive motor
69a-69d turntable supporting auxiliary roller
70a, 70b carriage drop-off stopper
71 annular support plate
72a, 72b turntable rotation limiting stopper
74 support guide surface
75, 76 auxiliary support guide surface
78 stopper main body
79 cam follower roller
80a, 80b carriage drop-off stopper controlling cam rail
81 conveyance carriage loading means
82 conveyance carriage unloading means
87 backup roller entering and exiting drive cylinder unit
88 movable base
89 conveyance carriage positioning means
90 normally-closed stopper
92 stopper main body
93 cam follower roller
94 normally-closed stopper controlling cam rail
95, 96 turntable positioning means
95a, 96a engagement device
95b, 96b engagement device entering and exiting drive cylinder unit
97a, 97b positioning engaged portion

BEST MODE FOR CARRYING OUT THE INVENTION

Hereinafter, a detailed embodiment of the present invention will be described with reference to the accompanying drawings. In FIG. 1, the reference numeral 1 denotes a conveyance carriage which travels on a cyclic traveling route formed of a pair of left and right guide rails 2a and 2b. This cyclic traveling route includes a forward route section 3 and a return route section 4 which are arranged linearly in parallel to each other, traverse route sections 5 and 6 across the ends of the route sections 3 and 4, and turntables 7 through 10 for changing the direction of the conveyance carriage, connecting the ends of the route sections 3 and 4 and the ends of the traverse route sections 5 and 6 adjacent to the ends of the route sections 3 and 4. In this embodiment, the forward route section 3 includes a work section occupying most of the entire length of the forward route section, that is, a work section 3A in which front and after conveyance carriages 1 travel at a low speed in a serial state that they abut against each other, and high-speed traveling sections at both ends of the work section 3A, that is, high-speed traveling sections 3B and 3C in which the front and after conveyance carriages 1 are separated from each other and travel at a high speed. Description on the use form of the return route section 4 is omitted, however, it may be constructed similarly to the forward route section 3, or its entire length is set as a high-speed traveling section.

At the entrance of the work section 3A, a rear-pushing drive means 11A which propels the conveyance carriage 1 at a constant speed is provided, and the exit of the work section, a braking drive means 11B for forwarding the conveyance carriage 1 at a constant speed is provided. In the high-speed traveling sections 3B and 3C, high-speed drive means 11C which propel the conveyance carriages 1 at a high speed are disposed at the intervals equal to or slightly shorter than the entire length of the conveyance carriage 1, and at the terminal ends of the high-speed traveling sections 3B and 3C, variable speed drive means 11D which reduce the traveling speed of the conveyance carriage 1 to a predetermined speed and then forward it are disposed. In the respective traverse route sections 5 and 6, variable speed drive means 11D which temporarily stop the conveyance carriages 1 unloaded from the turntables 7 through 9 on the upstream side and then load the conveyance carriages onto the turntables 8 through 10 on the downstream side when the turntables 8 through 10 on the downstream side turn into a conveyance carriage accepting state are disposed. Of course, when the route lengths of the traverse route sections 5 and 6 are long, high-speed drive means 11C are also used. In the return route section 4, although the drive means are omitted from illustration, appropriate drive means 11A through 11D are disposed according to the use form of this return route section.

By disposing the drive means 11A through 11D, in the work section 3A, the front and after conveyance carriages 1 become serial in a state that their ends are in contact with each other (abutting state), and at the entrance of the work section 3A, all conveyance carriages 1 in the work section 3A are pushed from the rear side and driven at a constant speed by the rearmost conveyance carriage 1 driven by the rear-pushing drive means 11A. At this time, the braking drive means 11B at the entrance of the work section 3A is driven at a torque lower than that of the rear-pushing drive means 11A and at a speed slightly lower than the drive speed of the rear-pushing drive means 11A, and by braking the forefront conveyance carriage 1 in the work section 3A, it is prevented that the conveyance carriage 1 pushed from the rear side travels at a speed more than the constant speed due to inertia and causes a gap between the conveyance carriages 1, and the conveyance carriages 1 are forwarded one by one at a constant speed from the inside of the work section 3A. The conveyance carriages 1 in the high-speed traveling sections 3B and 3C travel at a high speed while maintaining a predetermined interval between the front and after conveyance carriages 1, and are reduced in speed to a fixed low speed by the variable speed drive means 11D at the terminal end and forwarded to the downstream side.

Each of the drive means 11A through 11D uses a friction drive means constituted by a combination of a friction drive wheel 12 and a backup roller 13 sandwiching the left and right side surfaces (friction drive surfaces) of the conveyance carriage 1 whose two-dimensional shape is in a rectangular shape long in the traveling direction. The friction drive wheel 12 is driven by a motor 14.

Figure 2:
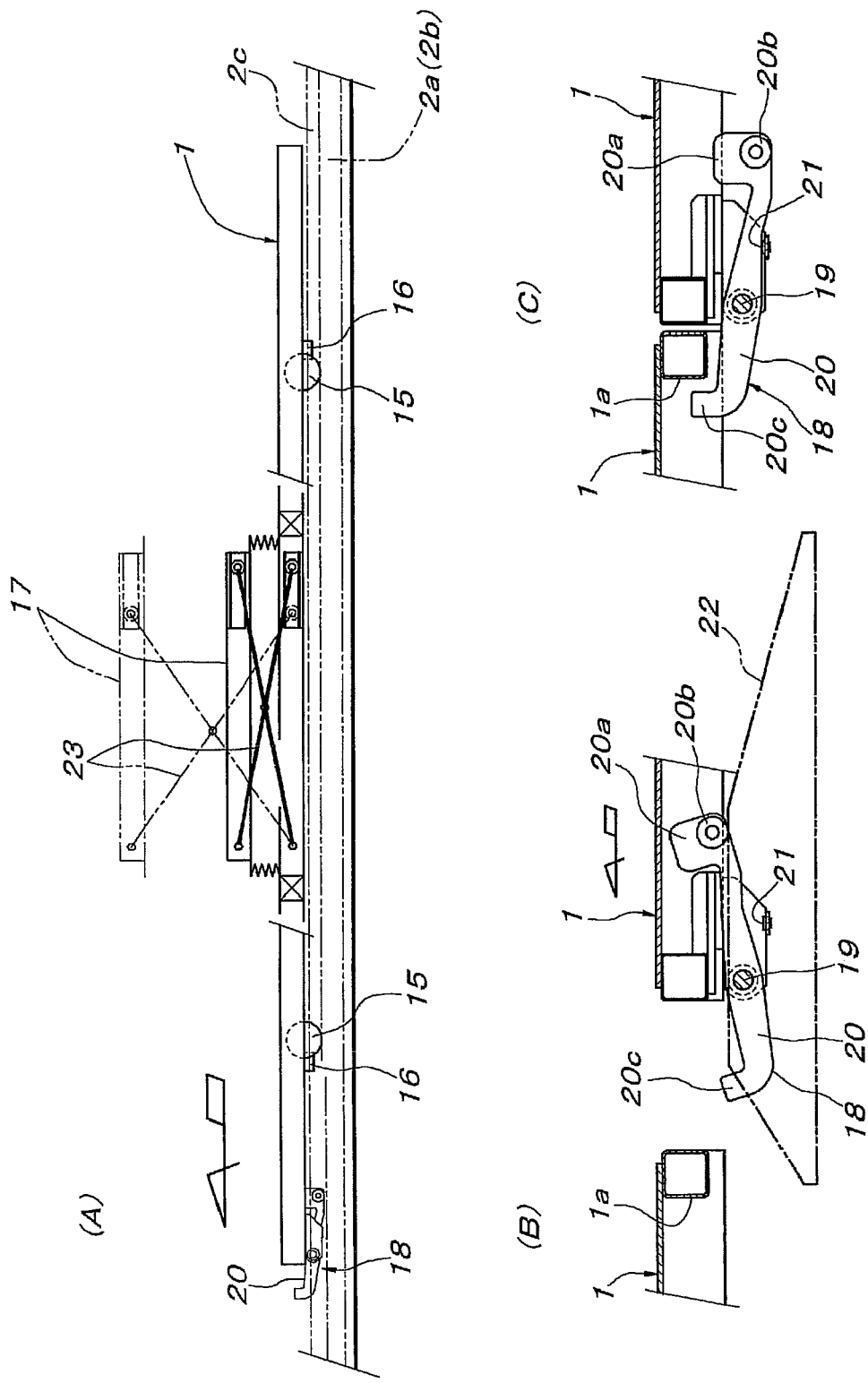
FIG. 2A is a schematic partially longitudinal sectional side view describing the entire construction of a conveyance carriage.
FIG. 2B is a longitudinal sectional side view of a main portion showing a state before joining operation of joining means.
FIG. 2C is a longitudinal sectional side view of a main portion showing a joining state of the same joining means.
Figure 3:
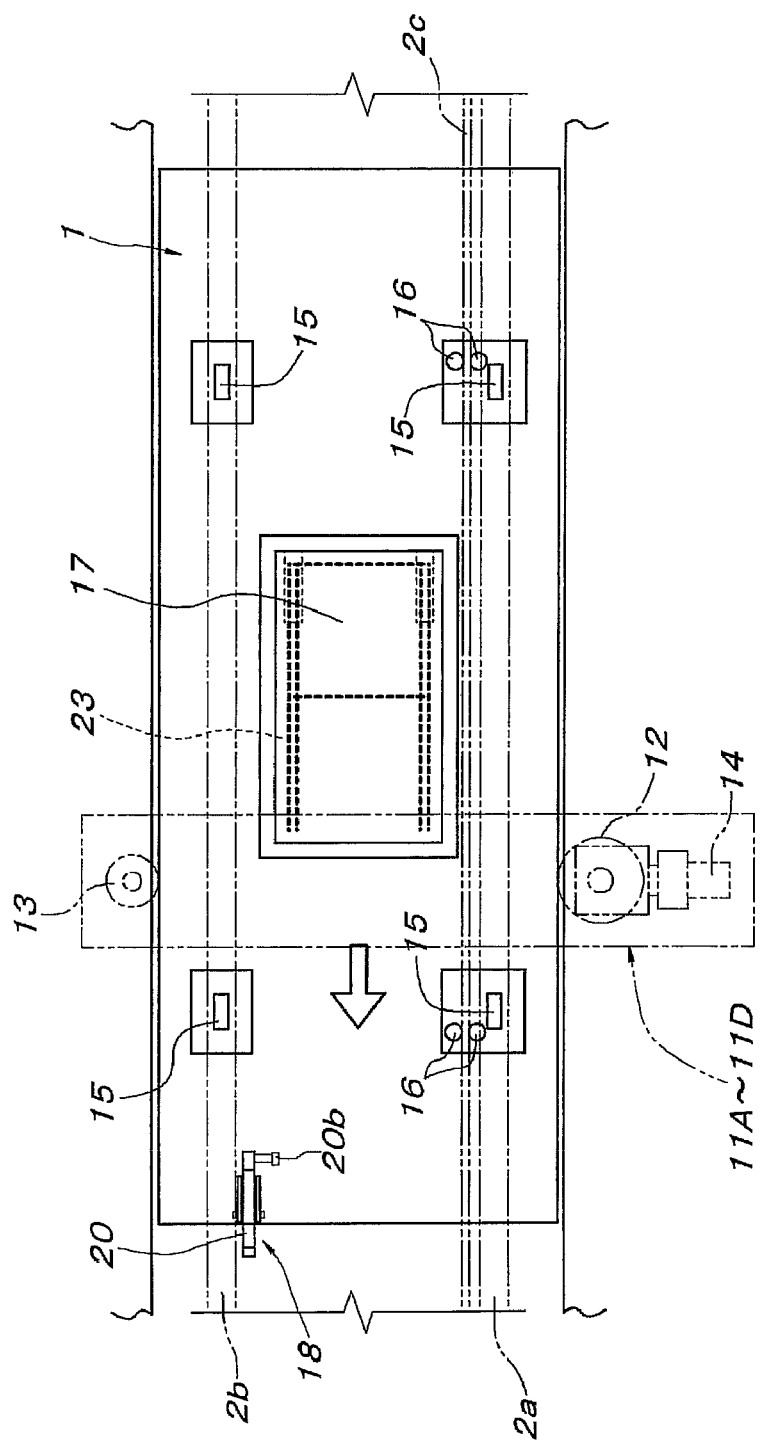
FIG. 3 is a schematic plan view describing the entire construction of the conveyance carriage.
Figure 4:
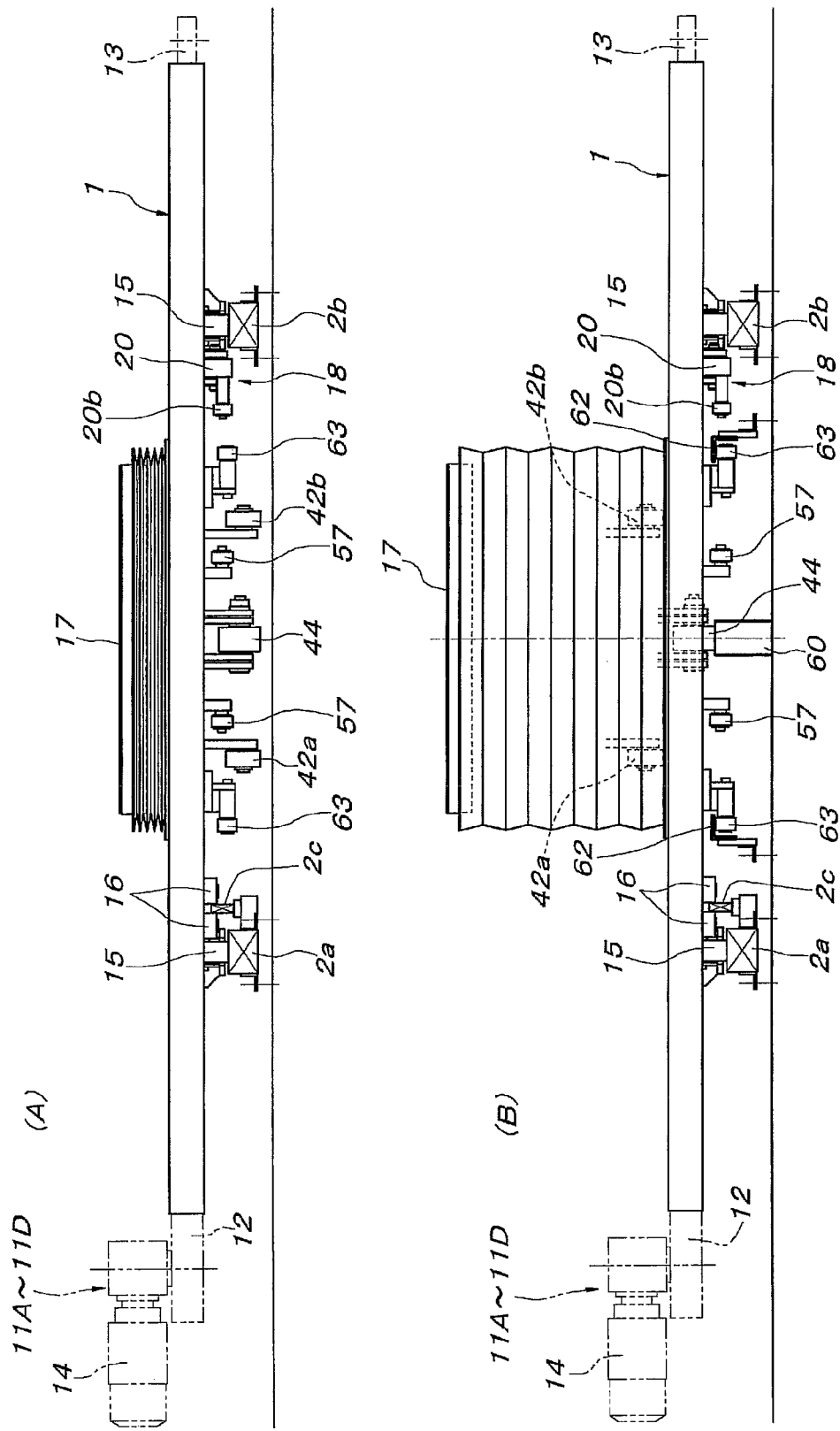
FIG. 4A is a back view of the conveyance carriage in a state that an object supporting base is at a lowered position.
FIG. 4B is a back view of the conveyance carriage in a state that the object supporting base is at a lifted position.

As shown in FIG. 2 through FIG. 4, the conveyance carriage 1 is supported so as to be capable of linearly advancing along the respective traveling routes 3 through 6 by two front and rear sets of a pair of left and right wheels 15 supported on the pair of left and right guide rails 2a and 2b, respectively, laid on the floor surface for forming the respective traveling routes 3 through 6, and two front and rear sets of a pair of left and right vertical shaft rollers 16 which sandwich one oscillation preventive guide rail 2c laid on the inner side of one guide rail 2a from both left and right sides at positions near the front and rear wheels 15, and at the central upper portion, a vertically movable object supporting base 17 is provided, and on the front end, a joining means 18 for joining to a conveyance carriage 1 just in front of said carriage is provided. This joining means 18 includes a joining device 20 which is long in the front and rear direction and axially supported on the front end lower side of the conveyance carriage 1 so as to be capable of making a seesaw motion by the horizontal support shaft 19, and this joining device 20 is provided with a weight portion 20a and a cam follower roller 20b at the rear end, and on the front end, an engaging portion 20c is continuously provided upward, and as shown in FIG. 2C, due to a downward urging force acting on the rear end side (a spring such as weight portion 20a, etc., can also be used at the same time), when the rear half of the joining device 20 is received by a receiving member 21 on the conveyance carriage 1 side and this joining device 20 turns into a substantially horizontal posture, the engaging portion 20c enters from below the inner side of the rear end left-to-right lateral member 1a of a conveyance carriage 1 right in front of the above-described conveyance carriage 1 which comes into contact with the front end of the above-described conveyance carriage 1 so that this front conveyance carriage 1 can be prevented from moving ahead.

As shown in FIG. 2B, according to riding onto the cam follower roller 20b onto the joining device opening cam rail 22 laid on the traveling route side, the engaging portion 20c tilts so as to lower against the urging force and the joining device 20 is switched from the joining posture into an opening posture, and the engaging portion 20c separates downward from the rear end left-to-right lateral member 1a of the immediately in front conveyance carriage 1, and allows this immediately in front conveyance carriage 1 to move ahead. Then, the joining device opening cam rail 22 is disposed at the entrance and exit of the work section 3A as shown in FIG. 1, and the cam rail 22 on the entrance side of the work section 3A switches the joining device 20 of the conveyance carriage 1 that is about to enter the work section 3A to the above-described opening posture and allows the front end of this conveyance carriage 1 to come into contact with the rear end of the rearmost conveyance carriage 1 entering in the work section 3A, and according to subsequent restoration of the joining device 20 into the joining posture, automatically engages the engaging portion 20c of the joining device 20 with the rear end left-to-right lateral member 1a of the immediately in front conveyance carriage 1, and the cam rail 22 on the exit side of the work section 3A switches the joining device 20 of the after conveyance carriage 1 in a joined state to the front conveyance carriage 1 that is about to exit from the work section 3A into an opening posture to enable the front conveyance carriage 1 to move ahead (rear side forward movement).

Next, lifting and lowering drive means of the object supporting base 17 on the conveyance carriage 1 will be described in detail with reference to FIG. 5 through FIG. 11. The object supporting base 17 is supported vertically movably by a crosslink mechanism 23 interposed between the object supporting base 17 and the conveyance carriage 1 on the lower side of the object supporting base 17. This crosslink mechanism 23 is constructed by parallely arranging two crosslinks 24a and 24b parallel to the traveling direction on both lower left and lower right sides of the object supporting base 17.

The pair of left and right crosslinks 24a and 24b of the crosslink mechanism 23 consist of two links 25a and 25b and 26a and 26b whose central intersections are pivotally attached by concentric center pivot shafts 27, and among each two links 25a through 26b, the front ends of the links 25a and 26a on the inner sides are pivotally attached to a pair of left and right bearing members 29 provided on a support frame 28 on the conveyance carriage 1 side by concentric position fixing pivot shafts 30 so as to be able to swing vertically, and the rear ends of the links 25a and 26a are joined by a common slide pivot shaft 31, and rollers 32 axially supported on both ends of the common slide pivot shaft 31 are fitted to a pair of left and right front-to-rear slide guides 33 provided on the rear end lower side of the object supporting base 17 so as to roll in the front and rear direction. Among each two links 25a through 26b, the front ends of the links 25b and 26b that come to the outer sides are pivotally attached to the pair of left and right bearing members 34 provided just above the pair of left and right bearing members 29 on the front end lower side of the object supporting base 17 by position fixing pivot shafts 35 concentric with each other so as to vertically swing, the rear ends of the links 25b and 26b are joined by a common slide pivot shaft 36, and the rollers 37 supported on both ends of the common slide pivot shaft 36 are fitted to a pair of left and right front-to-rear slide guides 38 provided just below the front-to-rear slide guides 33 on the support frame 28 on the conveyance carriage 1 side so as to roll in the front and rear direction.

The crosslink mechanism 23 is provided with first operated portion 39 and second operated portion 40. The first operated portion 39 consists of cam follower rollers 42a and 42b axially supported by left and right horizontal support shafts concentric with each other on the lower ends of projections 41a and 41b continuously provided downward from the links 25a and 26a that come to the inner sides among each two links 25a through 26b which constitute the pair of left and right crosslinks 24a and 24b. The projections 41a and 41b are continuously provided downward from positions near the central pivot shafts 27 at the intermediate positions between the central pivot shafts 27 of the links 25a and 26a and the common slide pivot shaft 31, and when the object supporting base 17 is at the lowering limit height as shown in FIG. 5, they project downward from the conveyance carriage 1 so that the cam follower rollers 42a and 42b are at positions near the floor surface.

The second operated portion 40 is formed of one cam follower roller 44 axially supported on a toggle link 43 provided in the crosslink mechanism 23. The toggle link 43 is constructed by joining a longer link 45 and a shorter link 46 to each other by an intermediate bend pivot shaft 47, and the links 45 and 46 composed of a pair of left and right link single bodies 45a and 45b and 46a and 46b, respectively, and the cam follower roller 44 is supported by the intermediate bend pivot shaft 47 between the link single bodies 45a and 45b of the longer link 45 on the inner side. This toggle link 43 is disposed substantially at the center between the pair of left and right crosslinks 24a and 24b, and the free ends of the longer links 45 are pivotally attached to intermediate positions between the central pivot shafts 27 of the links 25a and 26a on the inner side of the crosslinks 24a and 24b and the common slide pivot shaft 31 by a shaft-like cross member (support shaft member) 48 laid across the links 25a and 25a horizontally. The free ends of the shorter links 46 are pivotally attached to the bearing members 49 attached onto the support frame 28 on the conveyance carriage 1 side by a support shaft 50 positioned below the central pivot shaft 27 of the crosslinks 24a and 24b.

Figure 8:
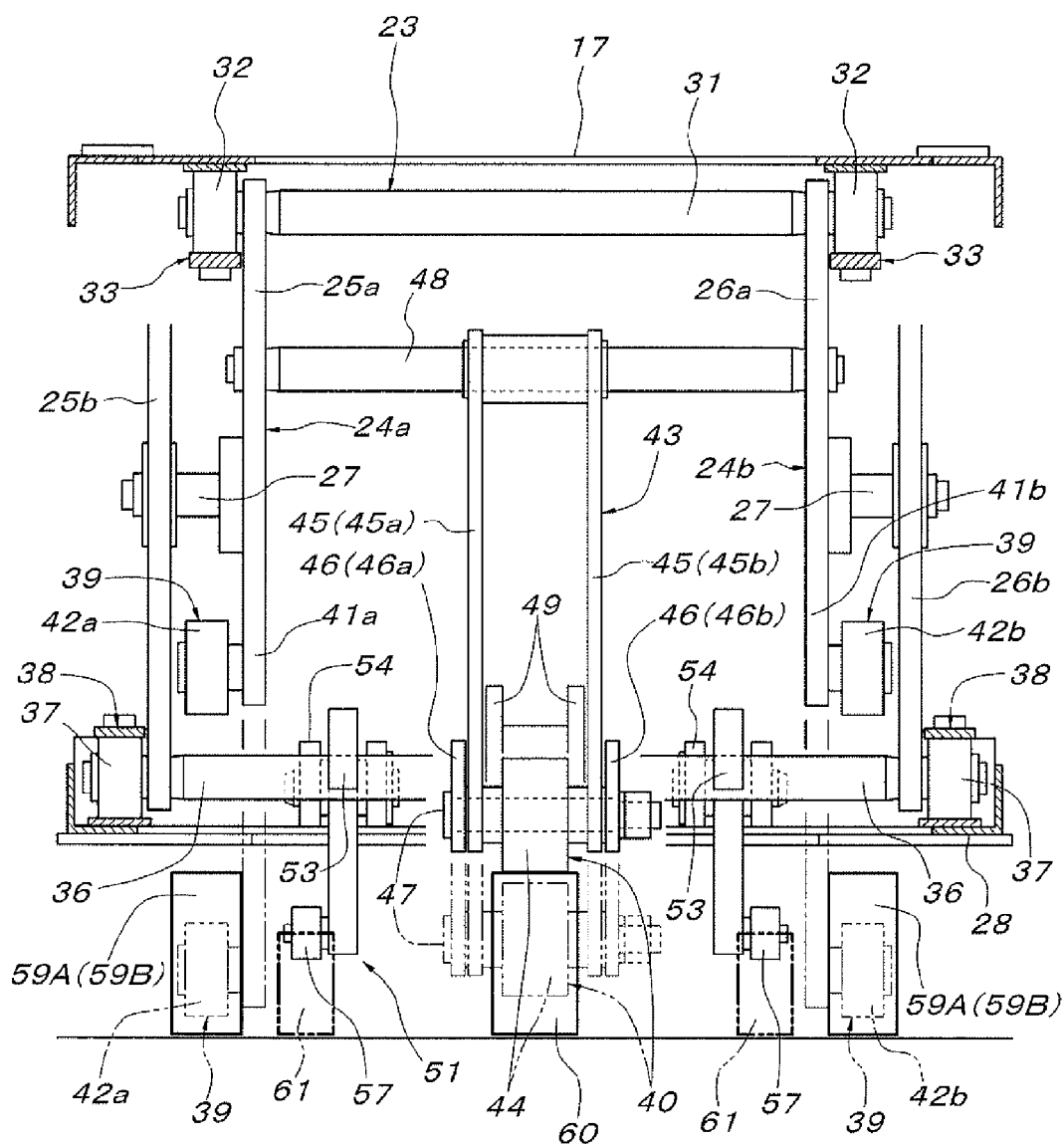
FIG. 8 is a longitudinal sectional back view in the state of FIG. 7.
Figure 9:
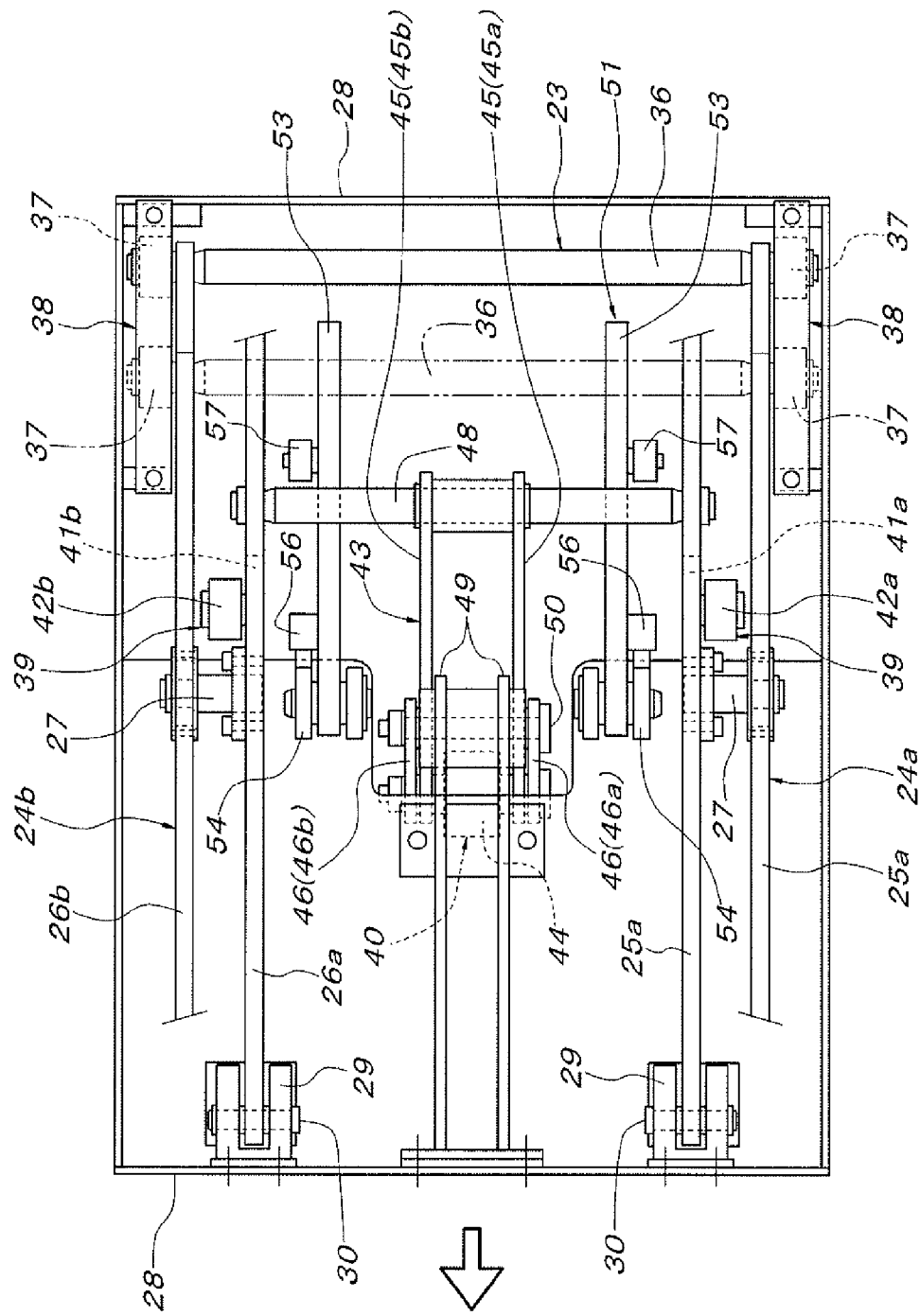
FIG. 9 is a plan view of a main portion showing a state when the object supporting base is at the lowered position.

As shown in FIG. 8, FIG. 9, and FIG. 11, in the crosslink mechanism 23, a locking means 51 for locking the object supporting base 17 at the lifted position is provided. This locking means 51 uses the common slide pivot shaft 36 laid across the links 25b and 26b on the outer side of the crosslinks 24a and 24b as an engaged portion 52, and includes a pair of left and right engagement devices 53 which automatically engage with the engaged portion 52. The engagement devices 53 have the same structure and are disposed in a left and right distributing state with respect to the second operated portion 40 so as to be at the intermediate positions between the pair of left and right cam follower rollers 42a and 42b of the first operated portion 39 and one cam follower roller 44 of the second operated portion 40, and the engagement devices are held by gravity at home positions at which the engagement devices are axially supported onto the bearing members 54 provided on the support frame 28 on the conveyance carriage 1 side by concentric left and right horizontal support shafts 55 so as to swing vertically, and contact members 56 attached to the respective engagement devices 53 are received by the bearing members 54. To the engagement devices 53, arms 53a are continuously and integrally provided downward, and on the lower ends of the arms 53a, cam follower rollers 57 are axially supported via the concentric left and right horizontal support shafts. The cam follower rollers 57 project further downward than the bottom surface of the conveyance carriage 1.

Figure 5:
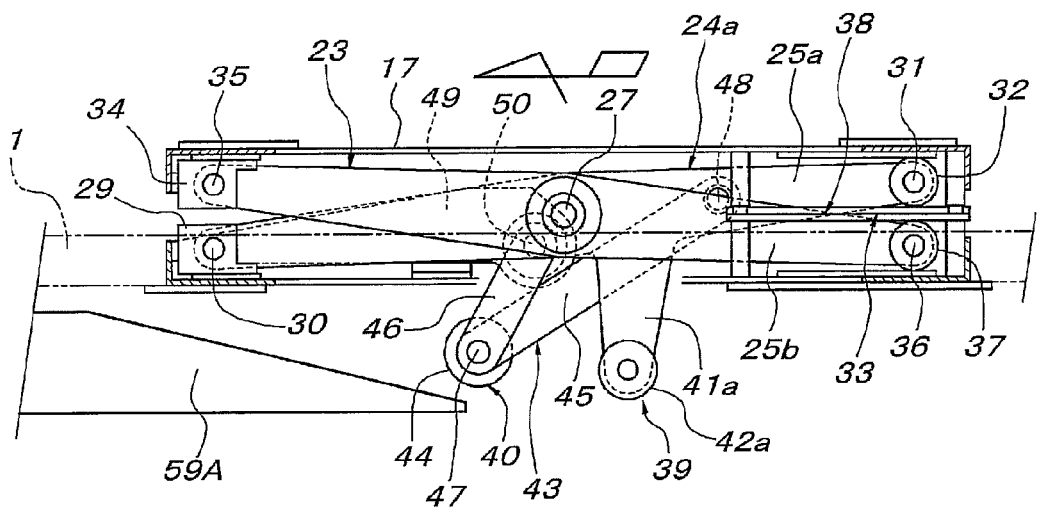
FIG. 5 is a longitudinal sectional side view of a main portion showing a state immediately before the object supporting base starts being lifted from the lowered position.

The object supporting base 17 is lowered due to gravity at the lowered position shown in FIG. 5 and stabilizes there in normal conditions. The height of the object supporting base 17 at this time can be determined by a support device capable of adjusting the height stood on the conveyance carriage 1 side (conventionally known device, not shown). When the object supporting base 17 is thus at the lowered position, the pair of left and right crosslinks 24a and 24b of the crosslink mechanism 23 are in a fall-down state as shown in FIG. 5, and the pair of left and right cam follower rollers 42a and 42b of the first operated portion 39 project by a maximum amount downward from the bottom surface of the conveyance carriage 1. Then, the cam follower roller 44 of the second operated portion 40 is substantially at the same level as the cam follower rollers 42a and 42b of the first operated portion 39, and the toggle link 43 having this cam follower roller 44 is folded so that both of free end pivots (cross member (support shaft member) 48 and support shaft 50) of the links 45 and 46 are positioned at the rear side of the traveling direction of the conveyance carriage 1 with respect to the cam follower roller 44. Therefore, in this state, it is not possible that the cam follower roller 44 is pushed up to stand the crosslink 24a and 24b.

Figure 10:
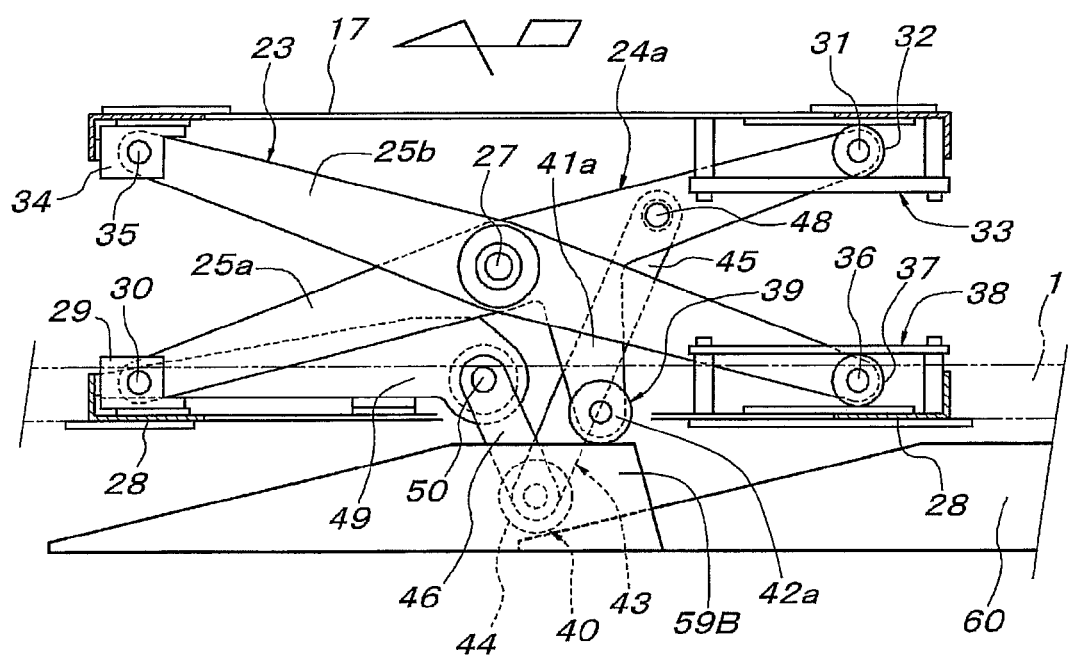
FIG. 10 is a longitudinal sectional side view of a main portion showing a state when the object supporting base is lowered from the lifted position to the middle height.

On the other hand, in the work section 3A in the traveling route of the conveyance carriage 1, a cam unit 58 for object supporting base vertical movement control and the like is provided. This cam unit 58 is composed of cam rails 59A, 59B, 60, and 61 described below. In detail, on the start point of the work section 3A (see FIG. 1), as shown in FIG. 5, a pair of left and right start point side first cam rails 59A which pushes up the pair of left and right cam follower rollers 42a and 42b of the first operated portion 39 according to the forward traveling of the conveyance carriage 1 are laid, and on the end point of the work section 3A, as shown in FIG. 10, a pair of left and right end point side first cam rails 59B which receive the pair of left and right cam follower rollers 42a and 42b of the first operated portion 39 being lowered and then lower the cam follower rollers 42a and 42b according to the forward traveling of the conveyance carriage 1 are laid, and furthermore, in the work section 3A from a position near the end point of the start point side first cam rails 59A to a position near the start point of the end point side first cam rails 59B, a second cam rail 60 which pushes up the cam follower roller 44 of the second operated portion 40 according to the forward traveling of the conveyance carriage 1 and holds it at a predetermined height is laid.

Figure 6:
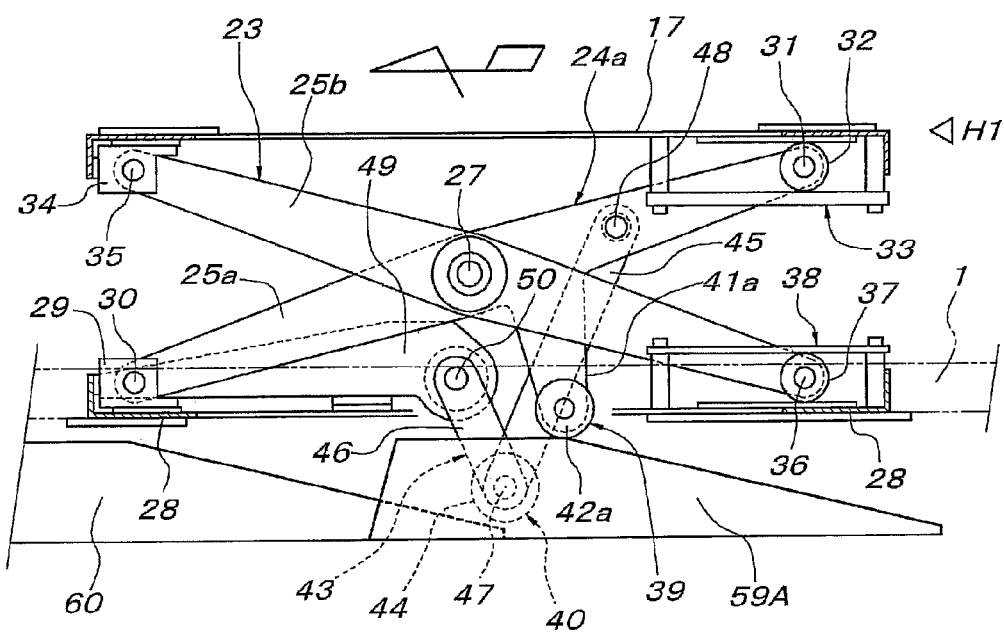
FIG. 6 is a longitudinal sectional side view of a main portion showing a state when the object supporting base is lifted to a middle height.

Then, when the conveyance carriage 1 enters into the work section 3A, as shown in FIG. 6, the pair of left and right cam follower rollers 42a and 42b of the first operated portion 39 ride onto the pair of left and right start point side first cam rails 59A, and the pair of left and right start point side first cam rails 59A pushes up the links 25a and 26a on the inner sides of the pair of left and right crosslinks 24a and 24b via the pair of left and right cam follower rollers 42a and 42b. Therefore, the pair of left and right crosslinks 24a and 24b move to stand in conjunction with each other, and the object supporting base 17 supported by the pair of left and right crosslinks 24a and 24b move up while maintaining a horizontal posture.

As shown in FIG. 6, when the pair of left and right cam follower rollers 42a and 42b reach the uppermost flat surfaces of the pair of left and right start point side first cam rails 59A, the object supporting base 17 reaches the predetermined middle height H1, and according to the standing movement of the crosslinks 24a and 24b during this upward movement of the object supporting base 17 from the lowered position to the middle height H1, the toggle link 43 is slightly developed from the folded state shown in FIG. 5 into a V-shaped state, and the cam follower roller 44 moves rearward substantially at the same level, and the free end pivots (cross member (support shaft member) 48 and support shaft 50) of the toggle link 43 are arranged so as to be distributed to the front side and the rear side with respect to the cam follower roller 44. Therefore, in this state, by pushing up the cam follower roller 44, the toggle link 43 can be further developed and the crosslinks 24a and 24b can be made to stand.

The second cam rail 60 is laid so that, while the cam follower rollers 42a and 42b roll on the uppermost flat surfaces of the start point side first cam rails 59A, the cam follower roller 44 of the second operated portion 40 starts riding onto the second cam rail 60. Of course, it is also possible that the uppermost flat surfaces are substantially omitted from start point side first cam rails 59A so that the cam follower roller 44 of the second operated portion 40 starts riding onto the second cam rail 60 immediately before the cam follower rollers 42a and 42b come out from the uppermost positions of the start point side first cam rails 59A.

Figure 7:
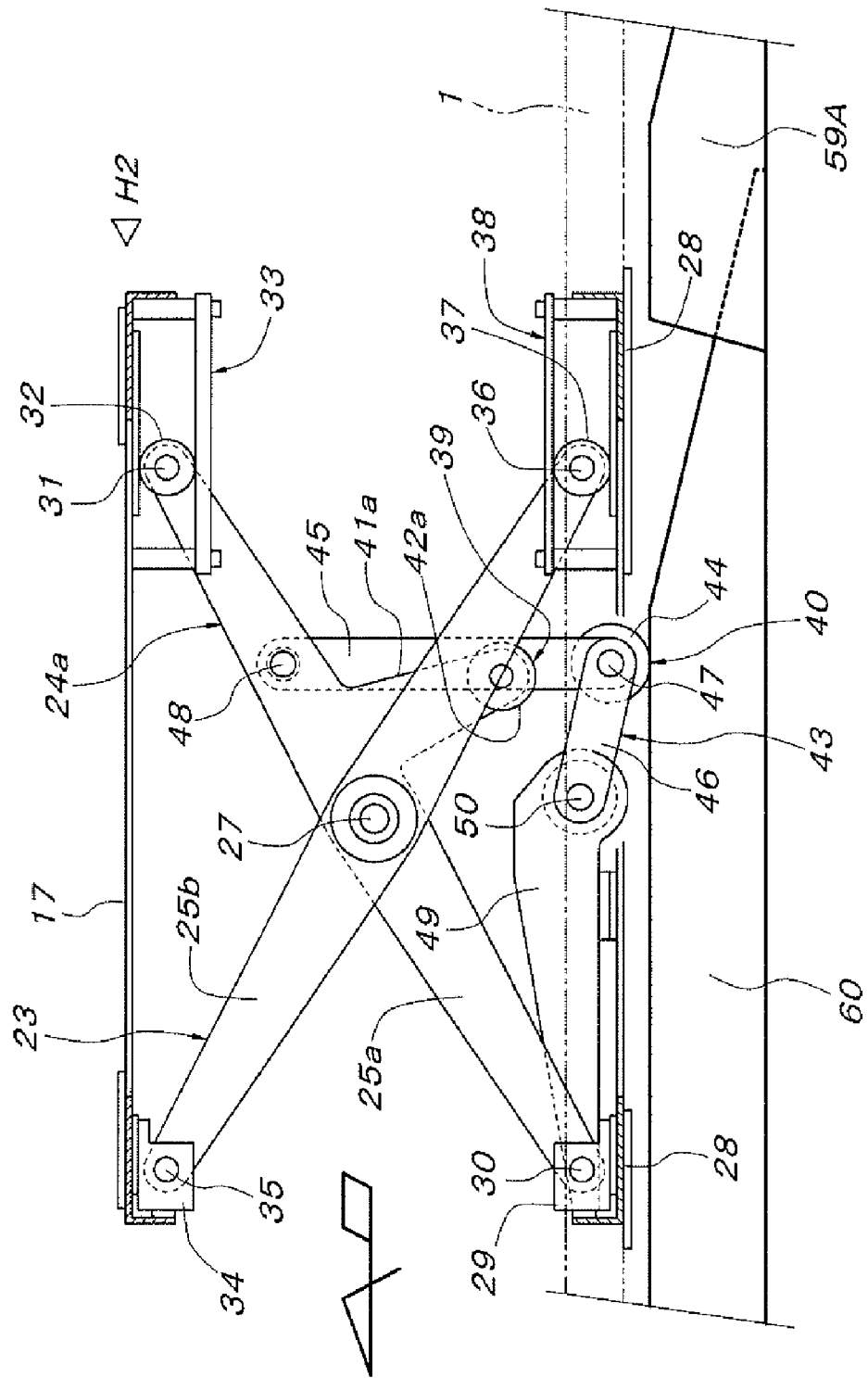
FIG. 7 is a longitudinal sectional side view of a main portion showing a state when the object supporting base reaches the lifted position.

Then, as the cam follower roller 44 of the second operated portion 40 rides onto the second cam rail 60 according to the traveling of the conveyance carriage 1, the shorter links 46 of the toggle link 43 swing upward around the support shaft 50, and the longer links 45 push up the crosslinks 24a and 24b via the cross member (support shaft member) 48 and stand these, so that when the cam follower roller 44 reaches the uppermost flat surface of the second cam rail 60, as shown in FIG. 7, the crosslinks 24a and 24b completely stand, and the object supporting base 17 rise from the middle height H1 to the lifted position H2.

As described above, when the crosslinks 24a and 24b stand up and the object supporting base 17 is lifted, the upper and lower common slide pivot shafts 31 and 36 in the pair of left and right crosslinks 24a and 24b slide forward horizontally via the rollers 32 and 37 and the slide guides 33 and 38, and immediately before the object supporting base 17 reaches the lifted position H2, the common slide pivot shaft 36 (engaged portion 52) on the lower side passes through the pair of left and right engagement devices 53 of the locking means 51 while pushing up the engagement devices via the inclined surface on the tip end lower side thereof, and when the object supporting base 17 reaches the lifted position H2, that is, when the cam follower roller 44 of the second operated portion 40 reaches the uppermost flat surface of the second cam rail 60, recessed engaging portions 53b of the pair of left and right engagement devices 53 fit and engage with this lower common slide pivot shaft 36 (engaged portion 52) from above due to gravity. Of course, springs for forcibly urging the respective engagement devices 53 downward can also be used.

That is, when the conveyance carriage 1 enters into the work section 3A, the object supporting base 17 positioned at the lowered position is automatically lifted to the lifted position H2, and at this time, as described above, the engagement devices 53 of the locking means 51 automatically engage with the engaged portions 52 (lower common slide pivot shaft 36) of the crosslinks 24a and 24b to block the fall-down movement from the standing state of the pair of left and right crosslinks 24a and 24b. That is, when the object supporting base 17 lowers from the lifted position H2, rearward sliding of the common slide pivot shaft 36 (engaged portions 52) of the crosslinks 24a and 24b in the standing state is blocked by the recessed engaging portions 53b of the engagement devices 53 engaging with this common slide pivot shaft 36 (engaged portions 52), so that even if the toggle link 43 axially supporting the cam follower roller 44 pushed up by the second cam rail 60 is bent or broken while the conveyance carriage 1 travels in the work section 3A in which the object supporting base 17 is lifted to the lifted position, the object supporting base 17 can be prevented from dropping from the lifted position H2.

Immediately before the end point of the work section 3A, as shown in FIG. 11, unlocking cams 61 are laid. The unlocking cams 61 are disposed on the left and right sides of the second cam rail 60 corresponding to the respective engagement devices 53 so that the cam follower rollers 57 of the engagement devices 53 ride onto these according to the traveling of the conveyance carriage 1, and the cam follower rollers 57 ride onto these unlocking cams 61 and the engagement devices 53 swing upward against gravity, the recessed engaging portions 53b of the engagement devices 53 are released upward from the common slide pivot shaft 36 (engaged portions 52) of the crosslinks 24a and 24b, and the crosslinks 24a and 24b in the standing state are unlocked.

After the above-described unlocking operation, the conveyance carriage 1 reaches the end point of the work section 3A, and the cam follower roller 44 of the second operated portion 40 becomes capable of descending the down slope at the end point of the second cam rail 60 according to traveling of the conveyance carriage 1, so that the object supporting base 17 lowers while making the crosslinks 24a and 24b fall down due to gravity. Then, as shown in FIG. 10, when the object supporting base 17 reaches the middle height H1 according to the traveling of the conveyance carriage 1, that is, at the time immediately before the cam follower roller 44 separates from the second cam rail 60, the pair of left and right cam follower rollers 42a and 42b of the first operated portion 39 are received by the uppermost flat surfaces of the pair of left and right end point side first cam rails 59B, and according to subsequent traveling of the conveyance carriage 1, the cam follower rollers 42a and 42b become able to descend the down slopes of the end point side first cam rails 59B, so that the object supporting base 17 further lowers from the middle height H1 while making the crosslinks 24a and 24b fall down due to gravity. Then, when the conveyance carriage 1 exits from the work section 3A, the cam follower rollers 42a and 42b completely separate from the end point side first cam rails 59B, the crosslinks 24a and 24b completely fall down, and the object supporting base 17 returns to the lowered position that is the home position.

To the cam unit 58, carriage floating preventive cam rails 62 shown in FIG. 4B can be added. That is, at appropriate positions on the bottom of the conveyance carriage 1, preferably, at the position just below the center of the object supporting base 17 in a side view and two left and right symmetrical positions with respect to the center in the left and right width direction of the conveyance carriage 1 in a front view, backup rollers 63 are axially supported by the horizontal support shafts by approaching these as close as possible to the bottom of the conveyance carriage 1, and a pair of left and right carriage floating preventive cam rails 62 which cover the pair of left and right backup rollers 63 to prevent floating of the conveyance carriage 1 can be laid. It is expected that, when the object supporting base 17 is pushed up by the first cam rails 59 and the second cam rails 60 according to the traveling of the conveyance carriage 1 the carriage floating preventive cam rails 62 brings about an effect to prevent the object supporting base 17 from rising with respect to the conveyance carriage 1 and float the conveyance carriage 1 itself when the load on the object supporting base 17 exceeds the limit load.

With the above-described construction, the conveyance carriage 1 sent into the work section 3A turns into a abutting state that its front end comes into contact with and is joined to the rear end of the preceding immediately in front conveyance carriage 1, and travels at a constant speed (low speed) due to rear-pushing driving in a state that the object supporting base 17 is lifted to the lifted position, and during this, an operator who rides on the conveyance carriage 1 performs work of assembling parts to the object placed on the conveyance supporting base 17. Then, from the forefront conveyance carriage 1 reaching the end point of the work section 3A, the object supporting base 17 is lowered to the lowered position and the joining between this conveyance carriage 1 and the immediately after conveyance carriage 1 by the joining means 18 of the immediately after conveyance carriage 1 is released, and the front conveyance carriage is switched into high-speed driving and separated from the immediately after conveyance carriage 1 and exits from the work section 3A. Thereafter, the conveyance carriage 1 is loaded on the turntable 7 by the variable speed drive means 11D as described above based on FIG. 1, and the construction of this turntable 7 will be described hereinafter.

The turntable 7 includes, as shown in FIG. 1 and FIG. 12 through FIG. 16, a pair of left and right guide rails 64a and 64b forming a conveyance carriage traveling route on the turntable 7, an intermediate frame 65 which joins and integrates the guide rails 64a and 64b together on their inner sides, a vertical support shaft 66 projectedly provided from the floor side for axially supporting this intermediate frame 65 rotatably, supporting rollers 67a through 67d axially supported by horizontal support shafts orthogonal to the vertical support shaft 66, provided outside the guide rails 64a and 64b at intermediate points two each in the rail length direction at equal distances from the vertical support shaft 66, motors 68a and 68b which drive and rotate the two supporting rollers 67c and 67d attached outside one guide rail 64b, supporting auxiliary rollers 69a through 69d axially supported outside the ends of the guide rails 64a and 64b by horizontal support shafts orthogonal to the vertical support shaft 66, and carriage drop-off stoppers 70a and 70b attached to the intermediate frame 65 between the ends of the guide rails 64a and 64b. The intermediate frame 65 includes a plurality of joints 65a which join the guide rails 64a and 64b, diagonal reinforcements 65b laid across the joints 65a, and a bearing plate 65c which is laid across the two joints 65a at the central positions and has a bearing for the vertical support shaft 66, and is constructed so as to be within the height range from the bottom surfaces of the guide rails 64a and 64b. On the intermediate frame 65, an oscillation preventive guide rail 64c to be connected to the oscillation preventive guide rail 2c of the forward route section 3 and the traverse route section 5 is laid adjacent to the inner side of the guide rail 64a.

Figure 12:
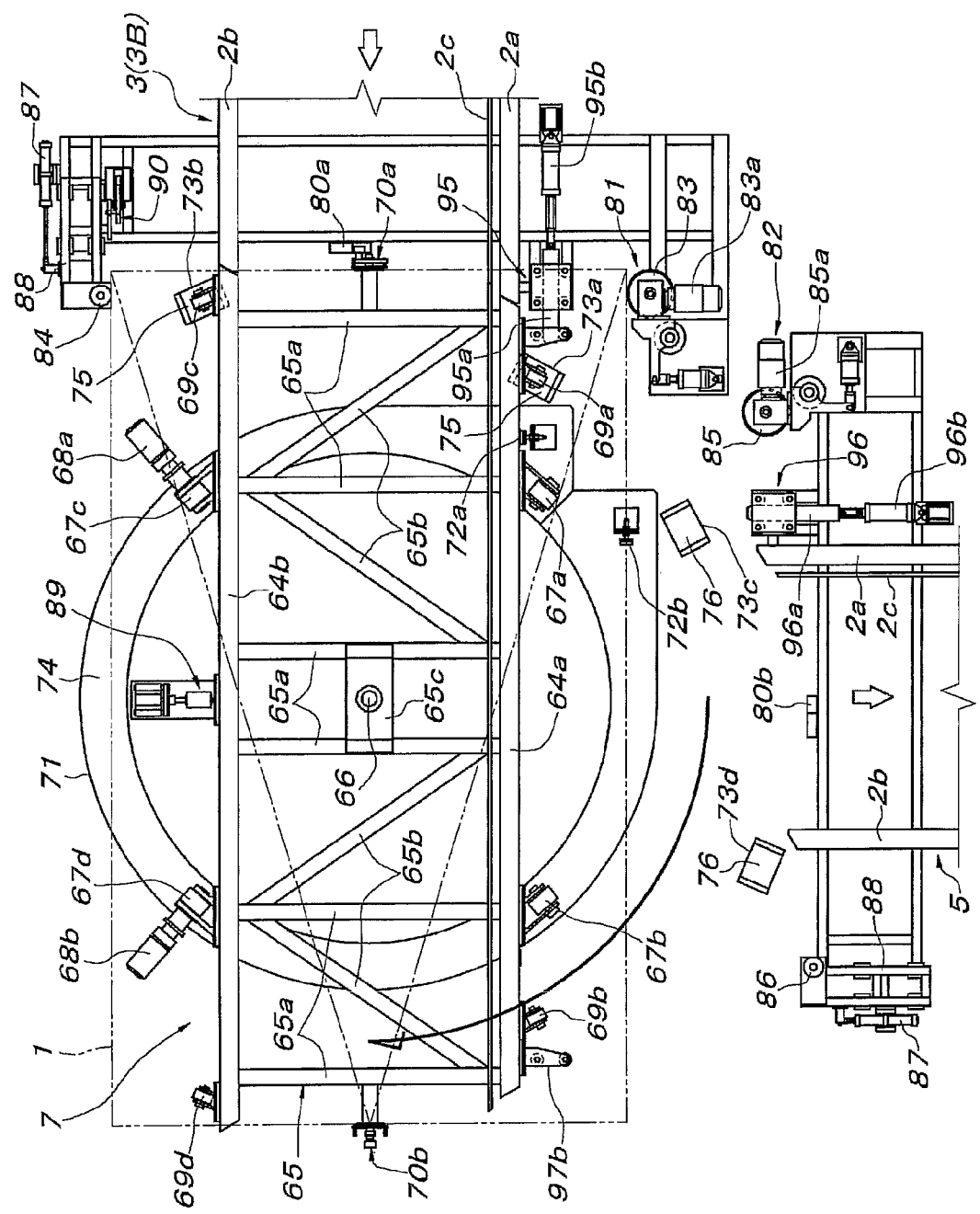
FIG. 12 is a plan view showing a state that a turntable for changing the direction of the conveyance carriage is connected to an upstream side traveling route.
Figure 13:
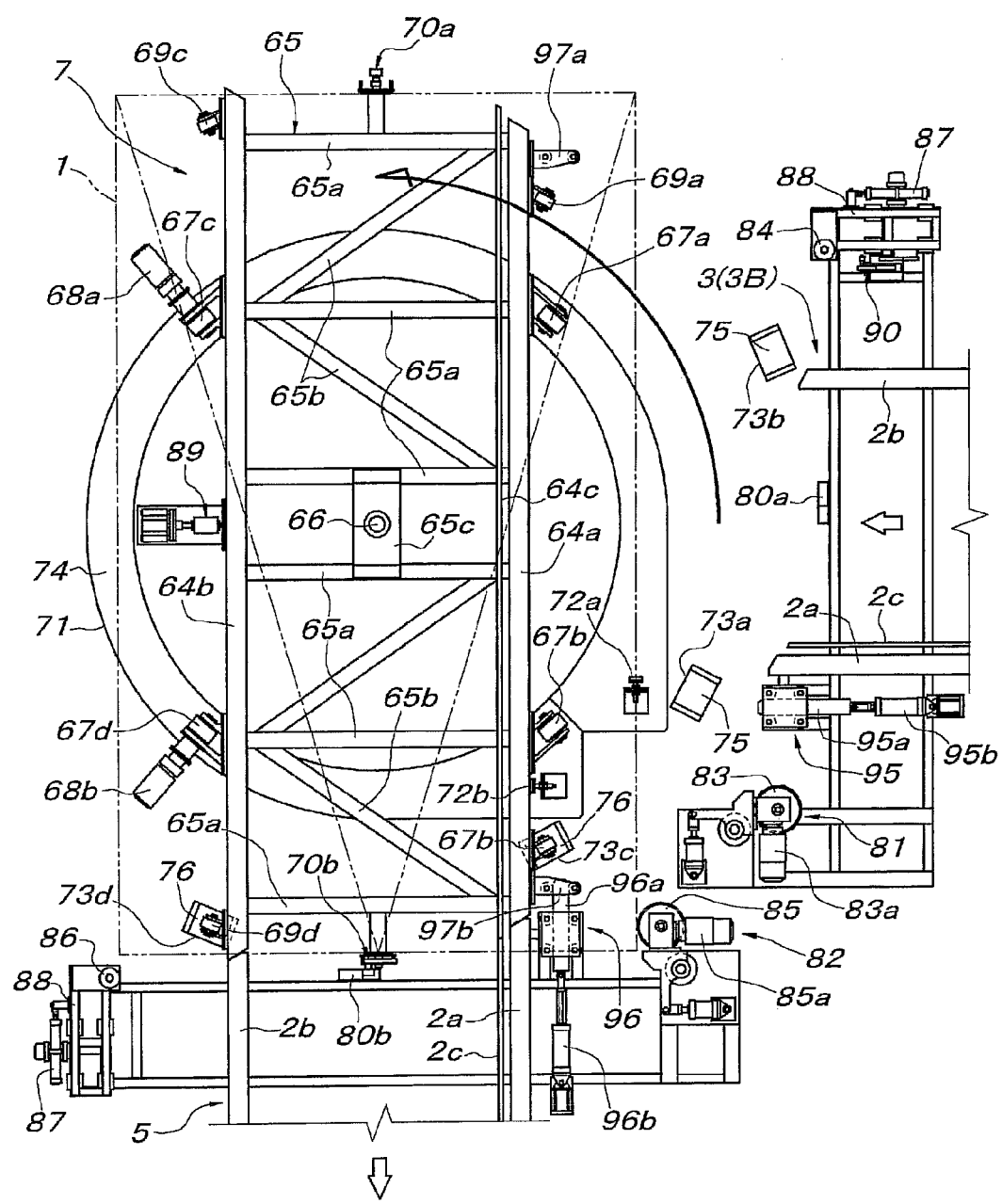
FIG. 13 is a plan view showing a state that a turntable for changing the direction of the conveyance carriage is connected to a downstream side traveling route.
Figure 14:
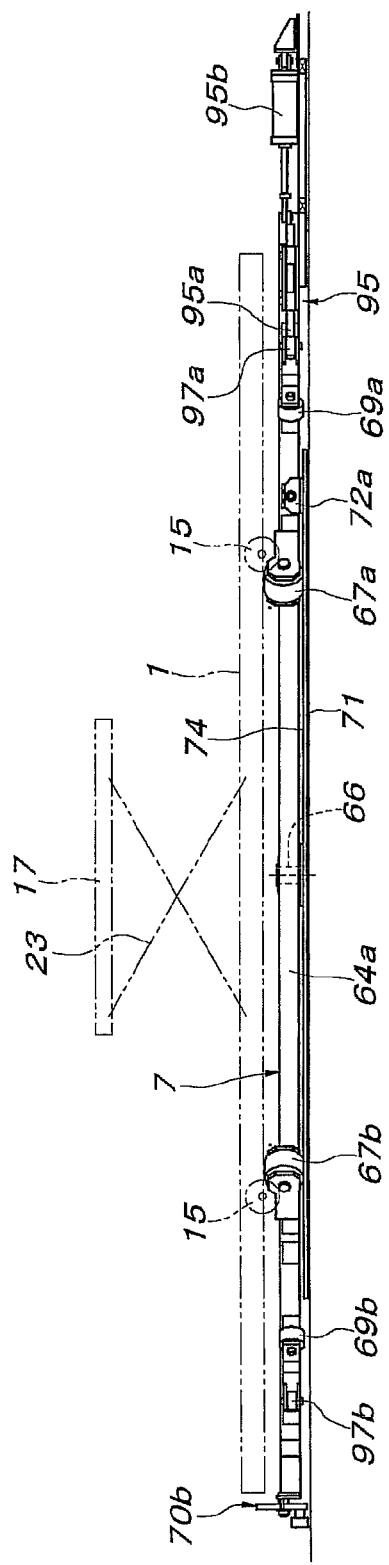
FIG. 14 is a side view of a main portion of FIG. 12.
Figure 15:
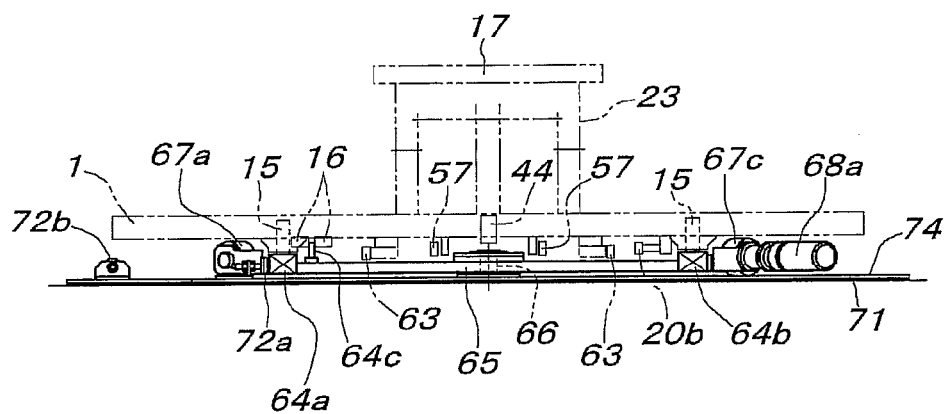
FIG. 15 is a front view showing a turntable main body portion of FIG. 12.
Figure 16:
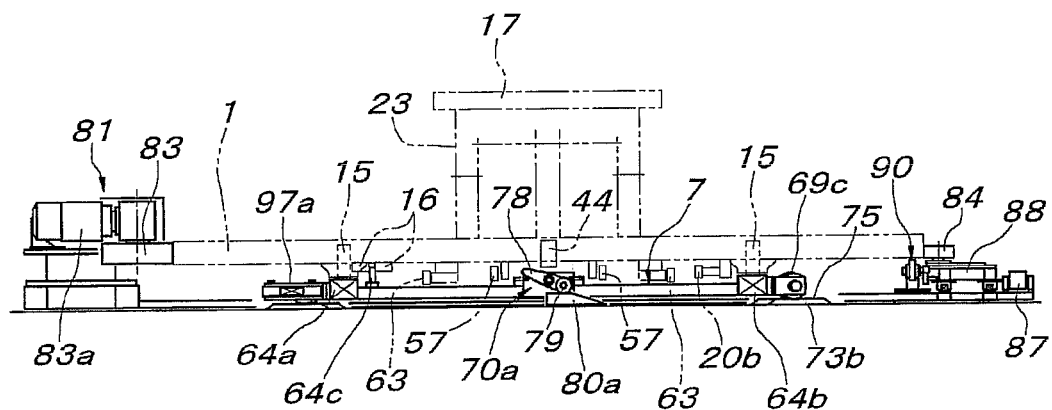
FIG. 16 is a front view showing a turntable main body portion of FIG. 12 and a conveyance carriage loading means.

On the floor side of the turntable 7, an annular support plate 71, turntable rotation limiting stoppers 72a and 72b, and auxiliary support plates 73a through 73d are disposed. The annular support plate 71 is laid on the floor surface concentrically with the vertical support shaft 66 so as to form the support guide surface 74 for supporting the supporting rollers 67a through 67d in a manner enabling these rollers to roll. As shown in FIG. 12, the turntable rotation limiting stopper 72a is projectedly provided on the floor surface so as to come into contact with the side surface near the end of the forward route section 3 side of one guide rail 64*a* positioned on the traverse route section 5 side when one ends of the guide rails 64*a* and 64*b* (ends on the carriage drop-off stopper 70*a* side) are connected to the guide rails 2*a* and 2*b* of the forward route section 3. As shown in FIG. 13, the turntable rotation limiting stopper 72*b* is projectedly provided on the floor surface so as to come into contact with the side surface near the end on the traverse route 5 side of the other guide rail 64*b* positioned on the forward route section 3 side when the other ends of the guide rails 64*a* and 64*b* (ends on the carriage drop-off stopper 70*b* side) are connected to the guide rails 2*a* and 2*b* of the traverse route section 5. As shown in FIG. 12, the auxiliary support plates 73*a* and 73*b* are laid separately on the floor surface so as to form the auxiliary support guide surfaces 75 which the pair of left and right supporting auxiliary rollers 69*a* and 69*c* on the side adjacent to the forward route section 3 ride onto to level one ends of the guide rails 64*a* and 64*b* on the turntable 7 to the same levels as the ends of the guide rails 2*a* and 2*b* of the forward route section 3 when the rotation of the turntable 7 is limited by the turntable rotation limiting stopper 72*a*. As shown in FIG. 13, the auxiliary support plates 73*c* and 73*d* are laid on the floor surface so as to form auxiliary support guide surfaces 76 which the pair of left and right supporting auxiliary rollers 69*b* and 69*d* on the side adjacent to the traverse route section 5 ride onto to level the other ends of the guide rails 64*a* and 64*b* on the turntable 7 to the same levels as the ends of the guide rails 2*a* and 2*b* when the rotation of the turntable 7 is limited by the turntable rotation limiting stopper 72*b*.

Figure 17:
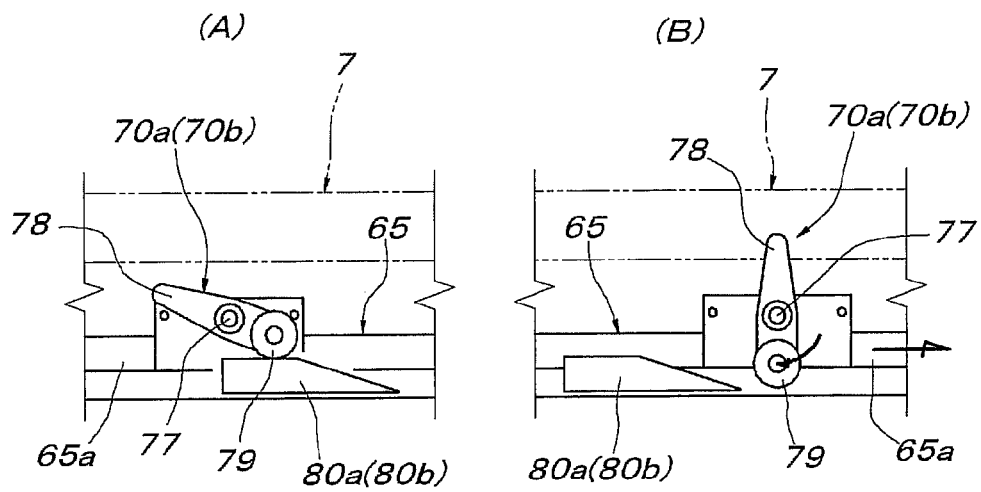
FIG. 17A is a front view of a main portion showing a state when carriage drop-off stoppers at both front and rear ends of the turntable are in a fall-down unworking posture.
FIG. 17B is a plan view of a main portion showing a state when the same carriage drop-off stoppers are in a standing working posture.

The carriage drop-off stoppers 70*a* and 70*b* includes, as shown in FIG. 17, a stopper main body 78 axially supported at its intermediate position on the joining member 65*a* of the intermediate frame 65 by a horizontal support shaft 77 parallel to the guide rail 64*a* or 64*b*, and a cam follower roller 79 axially supported on the lower end of this stopper main body 78, and is held in a standing working posture shown in FIG. 17B due to gravity (a spring can also be used together) acting on the cam follower roller 79 side, and the upper end of the stopper main body 78 in this standing working posture prevents the conveyance carriage 1 transferred onto the turntable 7 from dropping off the guide rail 64*a* or 64*b*. On the floor side, cam rails 80*a* and 80*b* are laid so that the cam follower rollers 79 ride on as shown in FIG. 17A and the stopper main bodies 78 rotatively fall down into the unworking posture withdrawn to the traveling route lower side of the conveyance carriage 1 when the rotation of the turntable 7 is limited by the turntable rotation limiting stopper 72*a* as shown in FIG. 12 and when the rotation of the turntable 7 is limited by the turntable rotation limiting stopper 72*b* as shown in FIG. 13.

As is clear from the construction described above, the turntable 7 can be rotated forward and reverse in a range of 90 degrees between the conveyance carriage receiving position (see FIG. 12) at which one ends of the guide rails 64*a* and 64*b* are connected to the guide rails 2*a* and 2*b* of the forward route section 3 and the conveyance carriage outgoing position (see FIG. 13) at which the other ends of the guide rails 64*a* and 64*b* are connected to the guide rails 2*a* and 2*b* of the traverse route section 5 by driving and rotating forward and reverse the supporting rollers 67*c* and 67*d* by the motors 68*a* and 68*b*, and when the turntable 7 is at the conveyance carriage receiving position, the conveyance carriage 1 is loaded onto the turntable 7 from the forward route section 3, and when the turntable 7 is at the conveyance carriage outgoing position, the conveyance carriage 1 can be unloaded from the turntable 7 to the traverse route section 5, and a conveyance carriage loading means 81 for loading the conveyance carriage 1 that has no self-traveling means onto the turntable 7 and a conveyance carriage unloading means 82 for unloading the conveyance carriage 1 from the turntable 7 to the traverse route section 5 are disposed on the floor side.

The conveyance carriage loading means 81 includes a friction drive wheel 83 and a backup roller 84 which sandwich both left and right side surfaces on the rear end of the conveyance carriage 1 placed at a predetermined position on the turntable 7 positioned at the conveyance carriage receiving position (see FIG. 12), and a motor 83*a* for driving the friction drive wheel 83, and the conveyance carriage unloading means 82 includes a friction drive wheel 85 and a backup roller 86 which sandwich both left and right side surfaces on the front end of the conveyance carriage 1 placed at a predetermined position on the turntable 7 positioned at the conveyance carriage outgoing position (see FIG. 13) and a motor 85*a* for driving the friction drive wheel 85. The friction drive wheel 83 of the conveyance carriage loading means 81 is disposed on the side from which the conveyance carriage 1 on the turntable 7 moves away according to rotation of the turntable 7 to the conveyance carriage outgoing position, and the friction drive wheel 85 of the conveyance carriage unloading means 82 is disposed on the side which the conveyance carriage 1 on the turntable 7 approaches according to rotation of the turntable 7 to the conveyance carriage receiving position, and the backup rollers 84 and 86 are constructed so as to freely exit from the inside to the outside of the rotation space of the conveyance carriage 1 on the turntable 7 according to rotation of the turntable 7. That is, like the backup roller 84 on the conveyance carriage loading means 81 side of FIG. 18A, the backup rollers 84 and 86 are supported so as to reciprocate in parallel to the side surfaces of the conveyance carriage 1 in contact with these backup rollers 84 and 86 and axially supported on the front end of a movable base 88 that is driven to reciprocate by a cylinder unit 87, and by reciprocating the movable base 88 by the cylinder unit 87, the backup rollers 84 and 86 can be switched between the working position at which the backup rollers 84 and 86 comes into contact with the side surfaces of the conveyance carriage 1 and the unworking position at which the backup rollers exit from the rotation space of the conveyance carriage 1 on the turntable 7 according to rotation of the turntable 7.

A conveyance carriage positioning means 89 for locking the conveyance carriage 1 on the turntable 7 to a predetermined position (see the imaginary lines of FIG. 12 and FIG. 13) is provided on the turntable 7. This conveyance carriage positioning means 89 is constructed so as to drive an engagement pin that can engage with and disengage from an engaged portion provided at an appropriate point on the side surface of the conveyance carriage 1 stopping at the predetermined position on the turntable 7 by an appropriate actuator such as a cylinder unit, and to provide the turntable 7 with a low-floor structure, it is desirable that the engagement pin is driven to project and withdraw horizontally by a cylinder unit.

Figure 18:
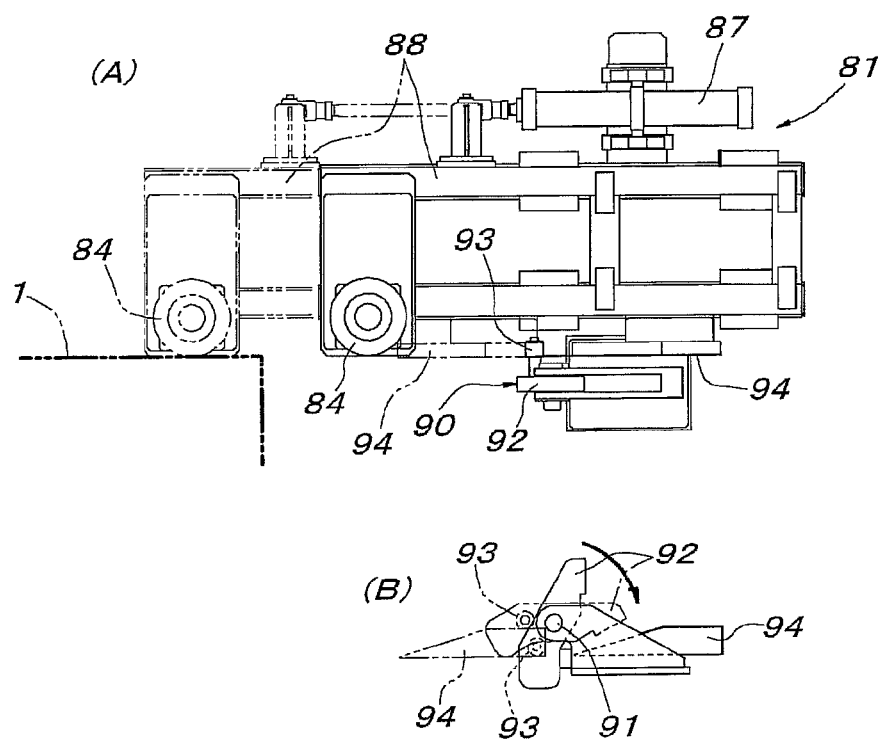
FIG. 18A is a plan view showing an entering and exiting drive means for backup rollers in a conveyance carriage loading means provided for the turntable and a normally-closed stopper for preventing dropping-off of the conveyance carriage from a position on the forward route section.
FIG. 18B is a side view showing only the same normally-closed stopper.

At the end on the turntable 7 side of the forward route section 3, a normally-closed stopper 90 is provided which freely stands and falls and prevents the conveyance carriage 1 from freely moving to the turntable 7 side from the forward route section 3 and dropping off the forward route section 3 in a state that the turntable 7 is not on standby at the conveyance carriage receiving position shown in FIG. 12. This normally-closed stopper 90 is provided adjacent to the inner side of the movable base 88 that advances and withdraws the backup roller 84 in the conveyance carriage loading means 81 as shown in FIG. 18, and includes a stopper main body 92 which is axially supported by a horizontal support shaft 91 so as to freely stand and fall only between a standing working posture and a fall-down unworking posture falling-down to the rear lower side, and held in the standing working posture by gravity (a spring may also be used together) acting on the lower end 92a, and a cam rail 94 which switches the stopper main body 92 into the fall-down unworking posture via a cam follower roller 93 axially supported on the lower end 92a of the stopper main body 92 is attached to the movable base 88 adjacent to the normally-closed stopper 90. When the cylinder unit 87 advances the movable base 88 in a state that the turntable 7 rotatively returns to the conveyance carriage receiving position shown in FIG. 12 and switches the backup roller 84 to the working position facing the friction drive wheel 83, as shown by the imaginary lines in FIG. 18B, this cam rail 94 pushes up the cam follower roller 93 forward in association with the advancing movement of the movable base 88 to switch the stopper main body 92 into the fall-down unworking posture. Therefore, when the backup roller 84 is moved to withdraw by the movable base 88 to rotate the turntable 7, the cam rail 93 also withdraws rearward from the position just below the cam follower roller 93, the stopper main body 92 automatically restores into the standing working posture due to an urging force, whereby the conveyance carriage 1 can be prevented from freely moving to the turntable 7 side from the end point of the forward route section 3.

Figure 19:
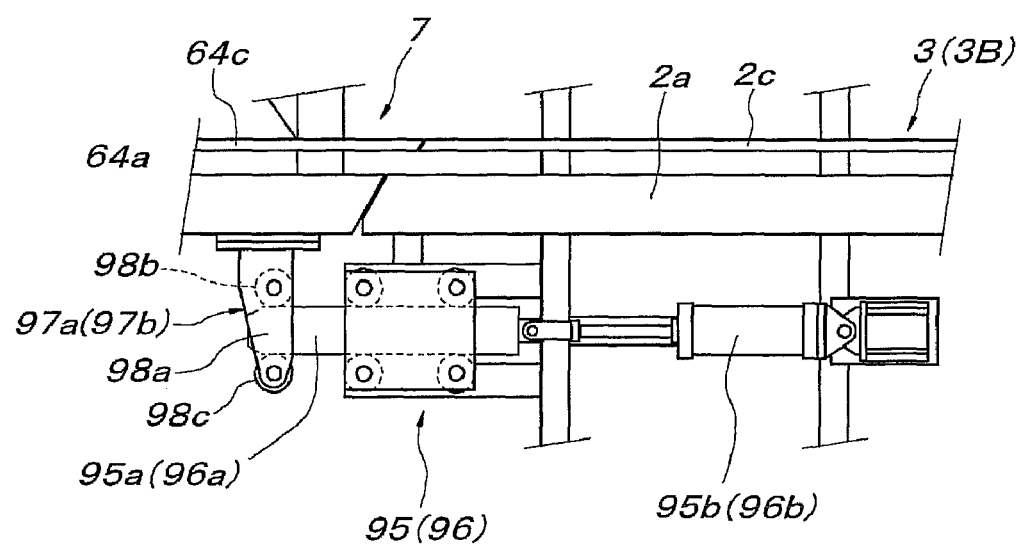
FIG. 19 is a plan view showing a turntable positioning means.

Furthermore, the turntable 7 is provided with a turntable positioning means 95 which locks the turntable 7 at the conveyance carriage receiving position shown in FIG. 12 and a turntable positioning means 96 which locks the turntable 7 at the conveyance carriage outgoing position shown in FIG. 13. These turntable positioning means 95 and 96 use the positioning engaged portions 97a and 97b projectly provided on the outer sides of both ends of the one guide rail 64a on the turntable 7, and the turntable positioning means 95 includes an engagement device 95a which can engage with and disengage from the positioning engaged portion 97a of the turntable 7 stopping at the conveyance carriage receiving position shown in FIG. 12, and a cylinder unit 95b which advances and withdraws the engagement device 95b, and the turntable positioning means 96 includes an engagement device 96a which can engage with and disengage from the positioning engaged portion 97b of the turntable 7 stopping at the conveyance carriage outgoing position shown in FIG. 13, and a cylinder unit 96b which advances and withdraws the engagement device 96a. The positioning engaged portions 97a and 97b are formed by axially supporting a pair of left and right vertical shaft rollers 98b and 98c at a appropriate distance from each other between upper and lower side plates 98a projectedly provided from the guide rails 64a as shown in FIG. 19, and by making the engagement devices 95a and 96a in pointed thick plate shapes to enter between the vertical shaft rollers 98a and 98b, the turntable 7 is accurately positioned.

The conveyance carriage 1 is loaded onto the turntable 7 constructed as described above from the end point of the forward route section 3, and as shown in FIG. 1, at the end point of the forward route section 3, that is, near the end point of the high-speed traveling route 3B, a cam unit 99 for switching the object supporting base 17 on the conveyance carriage 1 to the lifted position shown in FIG. 4B in the same manner as in sending into the work section 3A before being loaded onto the turntable 7 from the lowered position shown in FIG. 4A, is provided. This cam unit 99 uses the start point side first cam rails 59A and second cam rail 60 in the cam unit 58 disposed in the work section 3A, that is, in the cam unit 58 described in detail with reference to FIG. 5 through FIG. 11, and switches the object supporting base 17 to the lifted position according to traveling of the conveyance carriage 1 before the conveyance carriage 1 is transferred onto the turntable 7, and the second cam rail 60 is laid only in the range until the object supporting base 17 is completely switched to the lifted position, and is constructed so that the conveyance carriage 1 is sent to the turntable 7 side in a state that the object supporting base 17 is held at the lifted position by the locking means 51.

With the above-described construction, the turntable 7 that returned to the conveyance carriage receiving position shown in FIG. 12 is locked at the conveyance carriage receiving position by the turntable positioning means 95, the guide rails 64a and 64b on the turntable 7 side are connected to the guide rails 2a and 2b on the forward route section 3 side, and the carriage drop-off stopper 70a on the side adjacent to the forward route section 3 on the turntable 7 is switched to the fall-down unworking posture by the cam rail 80a, and furthermore, when the backup roller 84 of the conveyance carriage loading means 81 is switched to the advancing working position, and the normally-closed stopper 90 at the end point of the forward route section 3 is switched to the fall-down unworking position according to the advancing movement of the backup roller 84, the turntable 7 is completely readied for accepting the conveyance carriage, so that, in this state, the conveyance carriage 1 being on standby at the position of the variable seed drive means 11D at the end point of the forward route section 3, that is, at the end point of the high-speed traveling section 3B or arriving at the position of this variable speed drive means 11D can be sent to the turntable 7 side by the variable speed drive means 11D in a state that the object supporting base 17 is lifted to the lifted position by the cam unit 99. Therefore, by driving the friction drive wheel 83 of the conveyance carriage loading means 81 toward the carriage loading direction by the motor 83a, immediately before moving away from the variable speed drive means 11D, the conveyance carriage 1 is delivered to the friction drive wheel 83 of the conveyance carriage loading means 81 and the backup roller 84 at the advancing acting position and continuously frictionally driven, and the conveyance carriage 1 can be made to transferred onto the guide rails 64a and 64b of the turntable 7. When the conveyance carriage 1 is stopped at a predetermined position on the turntable 7, this conveyance carriage 1 is locked at the predetermined position by the conveyance carriage positioning means 89.

When the conveyance carriage 1 is transferred onto the turntable 7 as described above, the object supporting base 17 of the conveyance carriage 1 is switched to the lifted position, so that, as shown in FIG. 4A, the cam follower rollers 42a, 42b, and 44 for lifting and lowering the object supporting base which greatly projected below the bottom of the conveyance carriage 1 when the object supporting base 17 was at the lowered position slightly project above or below the bottom of the conveyance carriage 1, and therefore, as shown in the figure and described above, the turntable 7 can be formed to have a low-floor structure formed by joining the guide rails 64a and 64b by the intermediate frame 65 within the range of the height and axially supporting this intermediate frame 65 projectedly provided on the floor surface by the vertical support shaft 66.

When the conveyance carriage 1 is sent into the predetermined position on the turntable 7 and locked there by the conveyance carriage positioning means 89, the engagement device 95a of the turntable positioning means 95 is made to exit from the positioning engaged portion 97a on the turntable 7 side by the cylinder unit 95b and the turntable 7 is unlocked, and the backup roller 84 of the conveyance carriage loading means 81 is switched to the withdrawing unworking position by the cylinder unit 87. At this time, the backup roller 86 of the conveyance carriage unloading means 82 is also switched to the withdrawing unworking position shown in FIG. 12. As a result, when the turntable 7 rotates toward the side moving away from the turntable rotation limiting stopper 72a of FIG. 12, the conveyance carriage 1 at the predetermined position on the turntable 7 is prevented from interfering with the backup roller 84 of the conveyance carriage loading means 81 and the backup roller 86 of the conveyance carriage unloading means 82, so that the two supporting rollers 67c and 67d of the turntable 7 are driven and rotated by the motors 68a and 68b to rotate the turntable 7 by 90 degrees to the conveyance carriage outgoing position limited by the turntable rotation limiting stopper 72b as shown in FIG. 13, whereby the direction of the loaded conveyance carriage 1 can be changed by 90 degrees, and stopped in a state that the front end of the conveyance carriage 1 is turned toward the traverse route section 5. During this rotation of the turntable 7, both ends of the traveling route (guide rails 64a and 64b) on the turntable 7 are all closed by the carriage drop-off stoppers 70a and 70b in the standing working posture, and even if the conveyance carriage 1 cannot be locked at the predetermined position due to an operation failure of the conveyance carriage positioning means 89, there is no possibility that the conveyance carriage 1 unexpectedly drops off the turntable 7.

When the turntable 7 is rotated by 90 degrees to the conveyance carriage outgoing position, as shown in FIG. 13, the engagement device 96a of the turntable positioning means 96 is advanced by the cylinder unit 96b and engaged with the positioning engaged portion 97b on the turntable 7 side, and the turntable 7 is locked at the conveyance carriage outgoing position, and thereafter, the backup roller 86 of the conveyance carriage unloading means 82 is advanced by the cylinder unit 87 and switched to the working position. At this time, the carriage drop-off stopper 70b on the side adjacent to the traverse route section 5 on the turntable 7 is switched into the fall-down unworking posture by the cam rail 80b, and the guide rails 64a and 64b on the turntable 7 are in a state of being connected to the guide rails 2a and 2b of the traverse route section 5, so that by unlocking the conveyance carriage 1 locked by the conveyance carriage positioning means 89 on the turntable 7, it becomes possible to send the conveyance carriage 1 on the turntable 7 toward the forward route section 5 side. Therefore, by driving and rotating the friction drive wheel 85 of the conveyance carriage unloading means 82 sandwiching the front end left and right side surfaces of the conveyance carriage 1 on the turntable 7 between the same and the backup roller 86 toward the conveyance carriage unloading direction, the conveyance carriage 1 on the turntable 7 can be sent onto the guide rails 2a and 2b of the traverse route section 5.

When completely unloading the conveyance carriage 1, the turntable 7 locked by the turntable positioning means 96 is unlocked, and the backup roller 86 of the conveyance carriage unloading means 82 is switched to the withdrawing unworking position, and then the two supporting rollers 67c and 67d of the turntable 7 are driven to rotate reversely by the motors 68a and 68b to rotate the turntable 7 in reverse by 90 degrees to the conveyance carriage receiving position limited by the turntable rotation limiting stopper 72a as shown in FIG. 12, whereby the turntable can be made ready for direction change of the next conveyance carriage 1. At the time of this reverse rotation of the turntable 7 to the conveyance carriage receiving position, no conveyance carriage 1 is loaded on the turntable 7, so that the turntable 7 can be rotatively returned to the conveyance carriage receiving position without problems even if the backup roller 84 of the conveyance carriage loading means 81 is returned in advance to the advancing working position.

The conveyance carriage 1 unloaded from the turntable 7 to the traverse route section 5 is loaded onto the turntable 8 by the variable speed drive means 11D of the traverse route section 5 when the turntable 8 for changing the direction of the next conveyance carriage is readied for acceptance of the conveyance carriage, and this turntable 8 and the turntables 9 and 10 on the more downstream side are the same in structure and working as the turntable 7 except that only the upstream side traveling route from which the turntables 8 through 10 accept the conveyance carriage 1 and the downstream side traveling route to which the turntables 8 through 10 send the conveyance carriage 1 after being changed in direction are different from those of the turntable 7 between the forward route section 3 and the traverse route section 5. Therefore, the conveyance carriage 1 sent onto the turntable 8 is changed in direction by 90 degrees by the turntables 8 through 10, and while sent out to the downstream side traveling routes in a state that the front end of the conveyance carriage is turned toward the downstream side traveling routes (return route section 4, traverse route section 6, and forward route section 3) of the turntables 8 through 10, the conveyance carriage is sent out to the start point of the forward route section 3 via the return route section 4 and the traverse route section 6.

The conveyance carriage 1 is in a state that the object supporting base 17 is lifted to the lifted position by the cam unit 99 at the end point of the forward route section 3 and held by the locking means 51, so that to lift the object supporting base 17 of the conveyance carriage 1 to the lifted position only when passing through the positions above the turntables 7 through 10, the cam unit 99 is disposed at the end point of the upstream side traveling route of each of the turntables 7 through 10, and at the start point of the downstream side traveling route of each of the turntables 7 through 10, a cam unit 100 formed by an unlocking cam 61 of the cam unit 58 provided in the work section 3A, end point side first cam rails 59B, and the end points of the second cam rails 60 is disposed, however, in the layout of FIG. 1, the route lengths of the traverse route sections 5 and 6 are short, so that on these traverse route sections 5 and 6, the cam units 99 and 100 are not disposed, and on the end point of the upstream side traveling route (forward route section 3) of the turntable 7 and the end point of the upstream side traveling route (return route section 4) of the turntable 9, a cam unit 99 which switches the object supporting base 17 to the lifted position is disposed, and at the start point of the downstream traveling route (return route section 4) of the turntable 8 and the start point of the downstream side traveling route (return route section 3) of the turntable 10, the cam unit 100 which returns the object supporting base 17 from the lifted position to the lowered position is disposed.

With the above-described construction, in the direction changing route passing through the turntables 7 and 8 from the end point of the forward route section 3 to the start point of the return route section 4 and the traverse route section 5 and in the direction changing route passing through the turntables 9 and 10 from the end point of the return route section 4 to the start point of the forward route section 3 and the traverse route section 6, the conveyance carriage 1 travels while holding the object supporting base 17 at the lifted position, so that all turntables 7 through 10 can be constructed into a low-floor structure.

To hold the object supporting base 17 of the conveyance carriage 1 traveling and passing on the turntables 7 through 10 at the lifted position, the locking means 51 on the conveyance carriage 1 side is used, however, if the second cam rails 60 are laid on the intermediate frames 65 of the turntables 7 though 10, the locking means 51 can be used as a measure for preventing drop-off due to an unexpected accident of the object supporting base 17 of the conveyance carriage 1 traveling and passing on the turntables 7 through 10, similar to the role of the locking means 51 in the work section 3A. Furthermore, the object supporting base 17 is lowered from the lifted position to the lowered position at the end point of the work section 3A, and at the end point of the subsequent high-speed traveling section 3B, the object supporting base 17 is switched to the lifted position again by the cam unit 99, however, depending on the circumstances as in the case where the route length of the high-speed traveling section 3B is short, it is also possible that the conveyance carriage 1 is transferred from the high-speed traveling section 3B onto the turntable 7 while the object supporting base 17 is not lowered to the lowered position but is left held at the lifted position at the end point of the work section 3A. The present invention can also be carried out even in a layout in which the object is unloaded from the object supporting base 17 before the conveyance carriage 1 is transferred onto the turntable 7 and the vacant conveyance carriage 1 is changed in direction by the turntable 7.

INDUSTRIAL APPLICABILITY

For example, in an automobile assembly line in which various parts are assembled to vehicle bodies, the carriage-type conveyance device of the present invention can be used as a conveyance device for moving vehicle bodies loaded on conveyance carriages at a constant speed at equal intervals.

What is claimed is:

1. A conveyance device comprising an object supporting base vertically movable between a lowered position and a lifted position, provided on a conveyance carriage that can travel on a predetermined traveling route; cam follower rollers that move up and down in association with the object supporting base, provided at the bottom of the conveyance carriage; and cam rails for pushing up the cam follower rollers and a work section in which the object supporting base is held at the lifted position, provided in the traveling route of the conveyance carriage; and a turntable for changing the direction of the conveyance carriage, disposed in a traveling route on the downstream side of the work section, wherein
    between the work section and the turntable, a high-speed traveling section in which the carriage is made to travel at a high speed in a state that the object supporting base is lowered to the lowered position, is provided,
    at a position immediately before the turntable, cam rails for pushing up the cam follower rollers are disposed, and
    an object supporting base lifted position holding means for holding the object supporting base, which has been lifted to the lifted position by the cam follower rollers and the cam rails, at the lifted position until the conveyance carriage exits from the rotated turntable, is provided.

2. The conveyance device according to claim 1, wherein
    on the conveyance carriage, a means for locking the object supporting base at the lifted position is provided,
    at the lowered position to which the object supporting base is lowered in the traveling route, an unlocking means for releasing the locking means is provided, and
    the object supporting base lifted position holding means is formed by the locking means.

3. The conveyance device according to claim 1, wherein the turntable comprises a pair of left and right guide rails forming a conveyance carriage traveling route on this turntable, an intermediate frame which joins and integrates the guide rails together on their inner sides, a vertical support shaft projectedly provided from the floor side so as to axially support the intermediate frame rotatably, a plurality of supporting rollers which are attached outside the guide rails and roll on support guide surfaces on the floor side, and a motor which drives and rotates at least one of the supporting rollers.

4. The conveyance device according to claim 3, wherein
    the supporting rollers of the turntable are attached to intermediate positions in the longitudinal direction of the pair of left and right guide rails,
    to the ends of the pair of the left and right guide rails, other supporting auxiliary rollers are attached, and
    auxiliary support guide surfaces are provided on the floor side which level the ends of the guide rails via the supporting auxiliary rollers adjacent to the end of the traveling route when the conveyance carriage traveling route on the turntable is connected to the upstream side traveling route or the downstream side traveling route.

5. The conveyance device according to claim 1, wherein
    on the floor side, a means for loading the conveyance carriage onto the turntable from the upstream side traveling route and a means for unloading the conveyance carriage from the turntable to the downstream side traveling route are provided,
    each of these conveyance carriage loading means and conveyance carriage unloading means on the floor side comprises a friction drive wheel which comes into pressure contact with one of the left and right side surfaces parallel to the traveling direction provided on the conveyance carriage, and a backup roller which comes into contact with the other side surface,
    the turntable is driven to rotate forward and reverse in a range between a position at which one end of the conveyance carriage traveling route on this turntable is connected to the upstream side traveling route and a position at which the other end of the conveyance carriage traveling route on this turntable is connected to the downstream side traveling route,
    the friction drive wheel of the conveyance carriage loading means is disposed on the floor side at the side from which the conveyance carriage loaded onto the turntable moves away according to the rotation of the turntable,
    the friction drive wheel of the conveyance carriage unloading means is disposed on the floor side at the side which the conveyance carriage on the turntable approaches according to the rotation of the turntable, and
    the backup rollers of the conveyance carriage loading means and the conveyance carriage unloading means are constructed so as to freely exit from the inside to the outside of the rotation space of the conveyance carriage on the turntable according to the rotation of the turntable.

6. The conveyance device according to claim 5, wherein
    at the end of the upstream side traveling route to which the conveyance carriage traveling route on the turntable is connected, a normally-closed stopper that freely stands and falls is provided for preventing dropping-off of the conveyance carriage, and
    a cam means which interlocks with advancing and withdrawing movements of the backup roller of the conveyance carriage loading means is provided, and this cam means switches the normally-closed stopper to an unworking position by interlocking with the withdrawing movement of the backup roller of the conveyance carriage loading means.

7. A conveyance device comprising an object supporting base vertically movable between a lowered position and a lifted position, provided on a conveyance carriage that can travel on a predetermined traveling route; cam follower rollers that move up and down in association with the object supporting base, provided at the bottom of the conveyance carriage; and cam rails for pushing up the cam follower rollers and a work section in which the object supporting base is held at the lifted position, provided in the traveling route of the conveyance carriage, wherein in a traveling route on the downstream side of the work section, a turntable for changing the direction of the conveyance carriage is disposed, an object supporting base lifted position holding means for holding the object supporting base of the conveyance carriage at the lifted position at least from the time immediately before the conveyance carriage enters into the turntable until the conveyance carriage exits from the rotated turntable, is provided;

the turntable comprises a pair of left and right guide rails forming a conveyance carriage traveling route on this turntable, an intermediate frame which joins and integrates the guide rails together on their inner sides, a vertical support shaft projectedly provided from the floor side so as to axially support the intermediate frame rotatably, a plurality of supporting rollers which are attached outside the guide rails and roll on support guide surfaces on the floor side, and a motor which drives and rotates at least one of the supporting rollers;

the supporting rollers of the turntable are attached to intermediate positions in the longitudinal direction of the pair of left and right guide rails, to the ends of the pair of the left and right guide rails, other supporting auxiliary rollers are attached, and auxiliary support guide surfaces are provided on the floor side which level the ends of the guide rails via the supporting auxiliary rollers adjacent to the end of the traveling route when the conveyance carriage traveling route on the turntable is connected to the upstream side traveling route or the downstream side traveling route.

8. A conveyance device comprising an object supporting base vertically movable between a lowered position and a lifted position, provided on a conveyance carriage that can travel on a predetermined traveling route; cam follower rollers that move up and down in association with the object supporting base, provided at the bottom of the conveyance carriage; and cam rails for pushing up the cam follower rollers and a work section in which the object supporting base is held at the lifted position, provided in the traveling route of the conveyance carriage, wherein in a traveling route on the downstream side of the work section, a turntable for changing the direction of the conveyance carriage is disposed, an object supporting base lifted position holding means for holding the object supporting base of the conveyance carriage at the lifted position at least from the time immediately before the conveyance carriage enters into the turntable until the conveyance carriage exits from the rotated turntable, is provided on the floor side, a means for loading the conveyance carriage onto the turntable from the upstream side traveling route and a means for unloading the conveyance carriage from the turntable to the downstream side traveling route are provided, each of these conveyance carriage loading means and conveyance carriage unloading means on the floor side comprises a friction drive wheel which comes into pressure contact with one of the left and right side surfaces parallel to the traveling direction provided on the conveyance carriage, and a backup roller which comes into contact with the other side surface, the turntable is driven to rotate forward and reverse in a range between a position at which one end of the conveyance carriage traveling route on this turntable is connected to the upstream side traveling route and a position at which the other end of the conveyance carriage traveling route on this turntable is connected to the downstream side traveling route, the friction drive wheel of the conveyance carriage loading means is disposed on the floor side at the side from which the conveyance carriage loaded onto the turntable moves away according to the rotation of the turntable, the friction drive wheel of the conveyance carriage unloading means is disposed on the floor side at the side which the conveyance carriage on the turntable approaches according to the rotation of the turntable, and the backup rollers of the conveyance carriage loading means and the conveyance carriage unloading means are constructed so as to freely exit from the inside to the outside of the rotation space of the conveyance carriage on the turntable according to the rotation of the turntable.

9. The conveyance device according to claim 8, wherein at the end of the upstream side traveling route to which the conveyance carriage traveling route on the turntable is connected, a normally-closed stopper that freely stands and falls is provided for preventing dropping-off of the conveyance carriage, and a cam means which interlocks with advancing and withdrawing movements of the backup roller of the conveyance carriage loading means is provided, and this cam means switches the normally-closed stopper to an unworking position by interlocking with the withdrawing movement of the backup roller of the conveyance carriage loading means.

* * * * *